(12) United States Patent
Son et al.

(10) Patent No.: US 11,808,262 B2
(45) Date of Patent: Nov. 7, 2023

(54) LINEAR COMPRESSOR

(71) Applicant: LG ELECTRONICS INC., Seoul (KR)

(72) Inventors: Sangik Son, Seoul (KR); Wooju Jeon, Seoul (KR); Jaehyeok Lee, Seoul (KR); Donghan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/324,219

(22) Filed: May 19, 2021

(65) Prior Publication Data

US 2022/0049689 A1    Feb. 17, 2022

(30) Foreign Application Priority Data

Aug. 11, 2020   (KR) .......................... 10-2020-0100576

(51) Int. Cl.
| | | |
|---|---|---|
| *F04B 53/18* | (2006.01) | |
| *F04B 39/02* | (2006.01) | |
| *F16C 29/02* | (2006.01) | |
| *F04B 35/04* | (2006.01) | |

(52) U.S. Cl.
CPC .......... *F04B 53/18* (2013.01); *F04B 39/0276* (2013.01); *F04B 39/0292* (2013.01); *F16C 29/025* (2013.01); *F04B 35/045* (2013.01)

(58) Field of Classification Search
CPC ................ F04B 35/045; F04B 39/0292; F04B 39/0276; F04B 53/18; F16C 29/025
USPC .................................................. 384/293, 12
See application file for complete search history.

(56) References Cited

U.S. PATENT DOCUMENTS

| | | | | |
|---|---|---|---|---|
| 3,386,783 | A * | 6/1968 | Scheufler ............ | F16C 33/1065 384/291 |
| 3,777,722 | A * | 12/1973 | Lenger .................... | F04B 31/00 123/193.2 |
| 4,280,455 | A * | 7/1981 | Yamaguchi ................ | F16J 1/08 123/41.39 |
| 5,588,504 | A * | 12/1996 | Spiegel .................... | F01M 1/08 184/6.26 |
| 7,399,122 | B2 * | 7/2008 | Fujita ...................... | F16C 33/24 384/283 |

(Continued)

FOREIGN PATENT DOCUMENTS

| | | |
|---|---|---|
| KR | 101265133 | 5/2013 |
| KR | 20200004133 | 1/2020 |
| KR | 20200091698 | 7/2020 |

OTHER PUBLICATIONS

Office Action in Korean Appln. No. 10-2020-0100576, dated Aug. 26, 2021, 13 pages (with English translation).

*Primary Examiner* — Christopher S Bobish
(74) *Attorney, Agent, or Firm* — Fish & Richardson P.C.

(57) ABSTRACT

A linear compressor includes a cylinder that defines a compression space of a refrigerant and has a cylindrical shape, and a piston disposed in the cylinder and reciprocating along an axis of the cylinder. The cylinder includes a supply port radially passing through the cylinder, and a recess formed on an inner circumferential surface of the cylinder and communicating with the supply port. The supply port includes a first supply port and a second supply port disposed in a rear of the first supply port, and the recess includes a first recess and a second recess disposed in a rear of the first recess. The first recess and the second recess are formed in different shapes.

1 Claim, 18 Drawing Sheets

(56) References Cited

U.S. PATENT DOCUMENTS

| | | | | |
|---|---|---|---|---|
| 7,540,723 B2* | 6/2009 | Song | ............... | F04B 35/045 |
| | | | | 417/363 |
| 8,109,199 B2* | 2/2012 | Kim | ............... | F04B 39/02 |
| | | | | 92/84 |
| 8,381,696 B2* | 2/2013 | Urabe | ............... | F16J 10/04 |
| | | | | 123/193.2 |
| 8,708,567 B2* | 4/2014 | Lee | ............... | F16C 33/1065 |
| | | | | 384/293 |
| 9,494,148 B2* | 11/2016 | Ahn | ............... | F04B 39/12 |
| 9,989,052 B2* | 6/2018 | Park | ............... | C23C 28/343 |
| 10,302,124 B2* | 5/2019 | Amano | ............... | F16C 9/02 |
| 10,352,313 B2* | 7/2019 | Ha | ............... | F04B 39/122 |
| 10,968,907 B2* | 4/2021 | Ahn | ............... | F04B 39/0238 |
| 10,975,727 B2* | 4/2021 | Brandt | ............... | F16C 17/246 |
| 11,274,626 B2* | 3/2022 | Tufail | ............... | F02F 1/20 |
| 2008/0008610 A1* | 1/2008 | Muth | ............... | F04B 39/122 |
| | | | | 417/416 |
| 2010/0046866 A1* | 2/2010 | Schubert | ............... | F04B 35/045 |
| | | | | 384/105 |
| 2010/0150482 A1* | 6/2010 | Koizuka | ............... | F16J 10/04 |
| | | | | 384/12 |
| 2010/0247308 A1* | 9/2010 | Giacchi | ............... | B23K 26/0626 |
| | | | | 384/12 |
| 2013/0058815 A1* | 3/2013 | Kim | ............... | F04B 39/122 |
| | | | | 417/437 |
| 2015/0004025 A1* | 1/2015 | Kang | ............... | F04B 39/0276 |
| | | | | 417/415 |
| 2015/0369225 A1* | 12/2015 | Ha | ............... | F04B 39/122 |
| | | | | 417/443 |

* cited by examiner

LINEAR COMPRESSOR

CROSS-REFERENCE TO RELATED APPLICATIONS

This application claims the benefit of Korea Patent Application No. 10-2020-0100576, filed on Aug. 11, 2020, which is incorporated herein by reference for all purposes as if fully set forth herein.

TECHNICAL FIELD

The present disclosure relates to a linear compressor. More specifically, the present disclosure relates to a linear compressor for compressing a refrigerant by a linear reciprocating motion of a piston.

BACKGROUND

In general, a compressor refers to a device that is configured to receive power from a power generator such as a motor or a turbine and compress a working fluid such as air or refrigerant. More specifically, the compressors are widely used in the whole industry or home appliances, such as for a steam compression refrigeration cycle (hereinafter, referred to as "refrigeration cycle").

The compressors may be classified into a reciprocating compressor, a rotary compressor, and a scroll compressor according to a method of compressing the refrigerant.

The reciprocating compressor uses a method in which a compression space is formed between a piston and a cylinder, and the piston linearly reciprocates to compress a fluid. The rotary compressor uses a method of compressing a fluid by a roller that eccentrically rotates inside a cylinder. The scroll compressor uses a method of compressing a fluid by engaging and rotating a pair of spiral scrolls.

Recently, among the reciprocating compressors, the use of linear compressors that uses a linear reciprocating motion without using a crank shaft is gradually increasing. The linear compressor has advantages in that it has less mechanical loss resulting from switching a rotary motion to the linear reciprocating motion and thus can improve the efficiency, and has a relatively simple structure.

The linear compressor is configured such that a cylinder is positioned in a casing forming a sealed space to form a compression chamber, and a piston covering the compression chamber reciprocates in the cylinder. The linear compressor repeats a process in which a fluid in the sealed space is sucked into the compression chamber while the piston is positioned at a bottom dead center (BDC), and the fluid of the compression chamber is compressed and discharged while the piston is positioned at a top dead center (TDC).

A compression unit and a drive unit are installed inside the linear compressor. The compression unit performs a process of compressing and discharging a refrigerant while performing a resonant motion by a resonant spring through a movement generated in the drive unit.

The piston of the linear compressor repeatedly performs a series of processes of sucking the refrigerant into the casing through an intake pipe while reciprocating at high speed inside the cylinder by the resonant spring, and then discharging the refrigerant from a compression space through a forward movement of the piston to move it to a condenser through a discharge pipe.

The linear compressor may be classified into an oil lubricated linear compressor and a gas lubricated linear compressor according to a lubrication method.

The oil lubricated linear compressor is configured to store a predetermined amount of oil in the casing and lubricate between the cylinder and the piston using the oil.

On the other hand, the gas lubricated linear compressor is configured not to store an oil in the casing, induce a part of the refrigerant discharged from the compression space between the cylinder and the piston, and lubricate between the cylinder and the piston by a gas force of the refrigerant.

The oil lubricated linear compressor supplies the oil of a relatively low temperature between the cylinder and the piston and thus can suppress the cylinder and the piston from being overheated by motor heat or compression heat, etc. Hence, the oil lubricated linear compressor suppresses specific volume from increasing as the refrigerant passing through an intake flow path of the piston is sucked into the compression chamber of the cylinder and is heated, and thus can prevent in advance an intake loss from occurring.

However, when the refrigerant and an oil discharged to a refrigeration cycle device are not smoothly returned to the compressor, the oil lubricated linear compressor may experience an oil shortage in the casing of the compressor. The oil shortage in the casing may lead to a reduction in reliability of the compressor.

On the other hand, the gas lubricated linear compressor has advantages in that it can be made smaller than the oil lubricated linear compressor, and there is no reduction in the reliability of the compressor due to the oil shortage because it lubricates between the cylinder and the piston using the refrigerant.

Referring to FIGS. 21 to 23, in a related art linear compressor, during a compression stroke in which a piston 150 moves to the top dead center, as a difference between pressures of an upper part and a lower part of the piston 150 in a front area of the piston 150 decreases, a levitation force of the piston 150 relative to a cylinder 140 is weakened. In this case, there was a problem in that the piston 150 and the cylinder 140 collide with each other in the front area of the piston 150 since a gap between the piston 150 and the cylinder 140 is reduced.

Referring to FIGS. 24 and 25, when the piston 150 reciprocates between the top dead center and the bottom dead center, a position of a gas bearing support point of the piston 150 with respect to the cylinder 140 changes. Therefore, there was a problem in that it inhibits a stable support of the piston 150 with respect to the cylinder 140.

Prior Art Document (Patent Document 1) Korean Patent Application Publication No. 10-2003-0065836 A (published on Aug. 9, 2003)

SUMMARY

An object of the present disclosure is to provide a linear compressor capable of preventing a collision between a piston and a cylinder by increasing a minimum gap between the piston and the cylinder.

Another object of the present disclosure is to provide a linear compressor capable of stabilizing a support of a piston with respect to a cylinder.

In one aspect, there is provided a linear compressor comprising a cylinder that defines a compression space of a refrigerant and has a cylindrical shape; and a piston disposed in the cylinder and reciprocating along an axis of the cylinder, wherein the cylinder comprises a supply port radially passing through the cylinder, the supply port comprising a first supply port and a second supply port disposed in a rear of the first supply port; and a recess formed on an inner circumferential surface of the cylinder and communicating with the supply port, the recess comprising a first recess and a second recess disposed in a rear of the first recess.

In this case, the first recess and the second recess may be formed in different shapes.

Hence, a collision between the piston and the cylinder can be prevented by increasing a minimum gap between the piston and the cylinder.

In addition, a stale support of the piston with respect to the cylinder can be achieved.

A ratio of a circumferential direction length to an axial direction length of the first recess may be different from a ratio of a circumferential direction length to an axial direction length of the second recess.

An axial direction length of the first recess may be greater than a circumferential direction length of the first recess.

A circumferential direction length of the second recess may be greater than an axial direction length of the second recess.

An axial direction length of the first recess may be greater than an axial direction length of the second recess.

A circumferential direction length of the second recess may be greater than a circumferential direction length of the first recess.

A cross section of the first recess and a cross section of the second recess may have curvature.

An axial direction length of the first recess may be equal to or less than ¼ of an axial direction length between the first supply port and the second supply port.

The first recess may comprise a first portion extended in a circumferential direction, and a second portion connected to the first portion and extended along the axis.

A central area of the second portion in the circumferential direction may be formed to be deeper than other area of the second portion in the circumferential direction.

A front area of the second portion may be formed to be deeper than an axial direction center area of the second portion.

A central area of the first portion in the circumferential direction may be formed to be deeper than other area of the first portion in the circumferential direction.

In another aspect, there is provided a linear compressor comprising a cylinder that defines a compression space of a refrigerant and has a cylindrical shape; and a piston disposed in the cylinder and reciprocating along an axis of the cylinder, wherein the cylinder comprises a first second supply port and a second supply port radially passing through the cylinder, wherein the piston comprises a first recess formed on an outer circumferential surface of the piston and facing the first supply port, wherein the cylinder comprises a second recess formed on an inner circumferential surface of the cylinder and communicating with the second supply port, wherein the first recess is disposed in front of the second recess, In this case, the first recess and the second recess may be formed in different shapes.

Hence, a collision between the piston and the cylinder can be prevented by increasing a minimum gap between the piston and the cylinder.

In addition, a stale support of the piston with respect to the cylinder can be achieved.

A ratio of a circumferential direction length to an axial direction length of the first recess may be different from a ratio of a circumferential direction length to an axial direction length of the second recess.

An axial direction length of the first recess may be greater than a circumferential direction length of the first recess.

A circumferential direction length of the second recess may be greater than an axial direction length of the second recess.

An axial direction length of the first recess may be greater than an axial direction length of the second recess.

A circumferential direction length of the second recess may be greater than a circumferential direction length of the first recess.

A cross section of the first recess and a cross section of the second recess may have curvature.

The first recess may comprise a first portion extended in a circumferential direction, and a second portion connected to the first portion and extended along the axis.

Accordingly, embodiments of the present disclosure can provide a linear compressor capable of preventing a collision between a piston and a cylinder by increasing a minimum gap between the piston and the cylinder.

Further, embodiments of the present disclosure can provide a linear compressor capable of stabilizing a support of a piston with respect to a cylinder.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

It should be understood that when a component is described as being "connected to" or "coupled to" other component, it may be directly connected or coupled to the other component or intervening component(s) may be present.

It will be noted that a detailed description of known arts will be omitted if it is determined that the detailed description of the known arts can obscure embodiments of the present disclosure. The accompanying drawings are used to help easily understand various technical features and it should be understood that embodiments presented herein are not limited by the accompanying drawings. As such, the present disclosure should be understand to extend to any alterations, equivalents and substitutes in addition to those which are particularly set out in the accompanying drawings.

In addition, a term of "disclosure" may be replaced by document, specification, description, etc.

Figure 1:
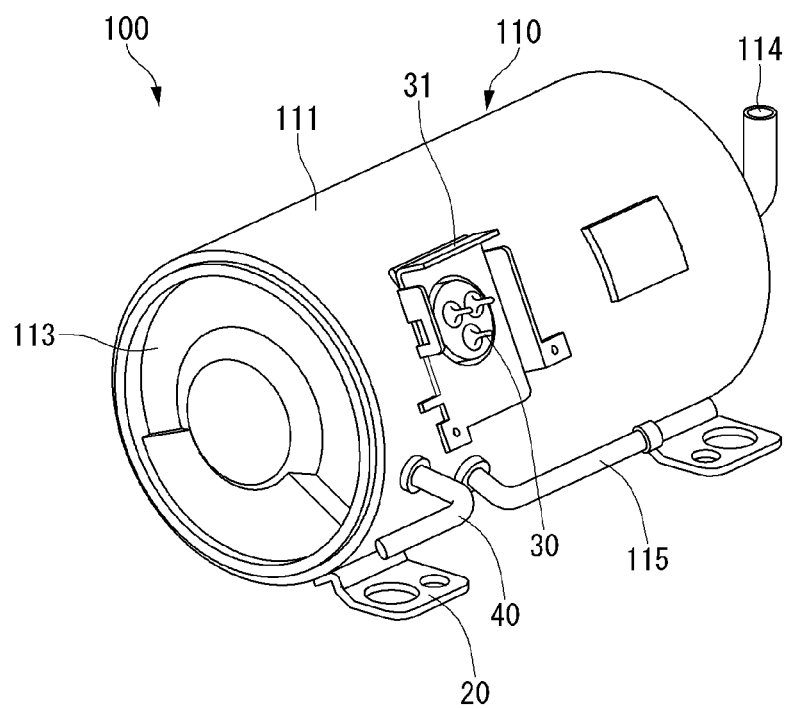
FIG. 1 is a perspective view of a linear compressor according to an embodiment of the present disclosure.

FIG. 1 is a perspective view of a compressor according to an embodiment of the present disclosure.

Referring to FIG. 1, a linear compressor 100 according to an embodiment of the present disclosure may include a shell 111 and shell covers 112 and 113 coupled to the shell 111. In a broad sense, the shell covers 112 and 113 can be understood as one configuration of the shell 111.

Legs 20 may be coupled to a lower side of the shell 111. The legs 20 may be coupled to a base of a product on which the linear compressor 100 is mounted. For example, the product may include a refrigerator, and the base may include a machine room base of the refrigerator. As another example, the product may include an outdoor unit of an air conditioner, and the base may include a base of the outdoor unit.

The shell 111 may have a substantially cylindrical shape and may be disposed to lie in a horizontal direction or an axial direction. FIG. 1 illustrates that the shell 111 is extended in the horizontal direction and has a slightly low height in a radial direction, by way of example. That is, since the linear compressor 100 can have a low height, there is an advantage in that a height of the machine room can decrease when the linear compressor 100 is installed in, for example, the machine room base of the refrigerator.

A longitudinal central axis of the shell 111 coincides with a central axis of a main body of the compressor 100 to be described below, and the central axis of the main body of the compressor 100 coincides with a central axis of a cylinder 140 and a piston 150 that constitute the main body of the compressor 100.

A terminal 30 may be installed on an external surface of the shell 111. The terminal 30 may transmit external electric power to a drive unit 130 of the linear compressor 100. More specifically, the terminal 30 may be connected to a lead line of a coil 132b.

A bracket 31 may be installed on the outside of the terminal 30. The bracket 31 may include a plurality of brackets surrounding the terminal 30. The bracket 31 may perform a function of protecting the terminal 30 from an external impact, etc.

Both sides of the shell 111 may be opened. The shell covers 112 and 113 may be coupled to both sides of the opened shell 111. More specifically, the shell covers 112 and 113 may include a first shell cover 112 coupled to one opened side of the shell 111 and a second shell cover 113 coupled to the other opened side of the shell 111. An inner space of the shell 111 may be sealed by the shell covers 112 and 113.

FIG. 1 illustrates that the first shell cover 112 is positioned on the right side of the linear compressor 100, and the second shell cover 113 is positioned on the left side of the linear compressor 100, by way of example. In other words, the first and second shell covers 112 and 113 may be disposed to face each other. It can be understood that the first shell cover 112 is positioned on an intake side of a refrigerant, and the second shell cover 113 is positioned on a discharge side of the refrigerant.

The linear compressor 100 may include a plurality of pipes 114, 115, and 40 that are included in the shell 111 or the shell covers 112 and 113 and can suck, discharge, or inject the refrigerant.

The plurality of pipes 114, 115, and 40 may include an intake pipe 114 that allows the refrigerant to be sucked into the linear compressor 100, a discharge pipe 115 that allows the compressed refrigerant to be discharged from the linear compressor 100, and a supplementary pipe 40 for supplementing the refrigerant in the linear compressor 100.

For example, the intake pipe 114 may be coupled to the first shell cover 112. The refrigerant may be sucked into the linear compressor 100 along the axial direction through the intake pipe 114.

The discharge pipe 115 may be coupled to an outer circumferential surface of the shell 111. The refrigerant sucked through the intake pipe 114 may be compressed while flowing in the axial direction. The compressed refrigerant may be discharged through the discharge pipe 115. The discharge pipe 115 may be disposed closer to the second shell cover 113 than to the first shell cover 112.

The supplementary pipe 40 may be coupled to the outer circumferential surface of the shell 111. A worker may inject the refrigerant into the linear compressor 100 through the supplementary pipe 40.

The supplementary pipe 40 may be coupled to the shell 111 at a different height from the discharge pipe 115 in order to prevent interference with the discharge pipe 115. Herein, the height may be understood as a distance measured from the leg 20 in a vertical direction. Because the discharge pipe 115 and the supplementary pipe 40 are coupled to the outer circumferential surface of the shell 111 at different heights, the work convenience can be attained.

On an inner circumferential surface of the shell 111 corresponding to a location at which the supplementary pipe 40 is coupled, at least a portion of the second shell cover 113 may be positioned adjacently. In other words, at least a portion of the second shell cover 113 may act as a resistance of the refrigerant injected through the supplementary pipe 40.

Thus, with respect to a flow path of the refrigerant, a size of the flow path of the refrigerant introduced through the supplementary pipe 40 is configured to decrease by the second shell cover 113 while the refrigerant enters into the inner space of the shell 111, and again increase while the refrigerant passes through the second shell cover 113. In this process, a pressure of the refrigerant may be reduced to vaporize the refrigerant, and an oil contained in the refrigerant may be separated. Thus, while the refrigerant, from which the oil is separated, is introduced into the piston 150, a compression performance of the refrigerant can be improved. The oil may be understood as a working oil present in a cooling system.

Figure 2:
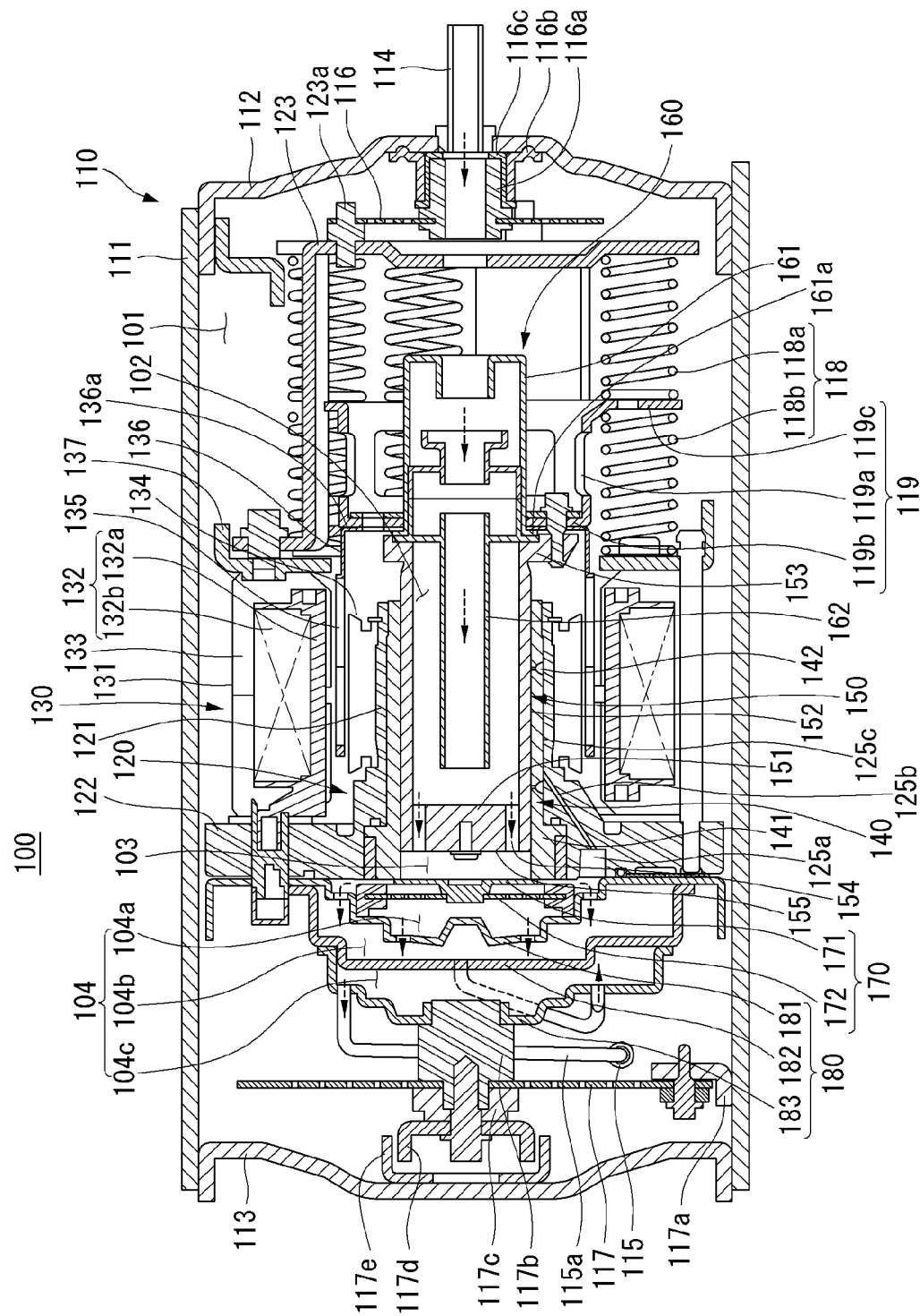
FIG. 2 is a cross-sectional view of a linear compressor according to an embodiment of the present disclosure.

FIG. 2 is a cross-sectional view illustrating a structure of the linear compressor 100.

Hereinafter, the linear compressor 100 according to the present disclosure will be described taking, as an example, a linear compressor that sucks and compresses a fluid while a piston linearly reciprocates, and discharges the compressed fluid.

The linear compressor 100 may be a component of a refrigeration cycle, and the fluid compressed in the linear compressor 100 may be a refrigerant circulating the refrigeration cycle. The refrigeration cycle may include a condenser, an expander, an evaporator, etc., in addition to the compressor. The linear compressor 100 may be used as a component of the cooling system of the refrigerator, but is not limited thereto. The linear compressor can be widely used in the whole industry.

Referring to FIG. 2, the compressor 100 may include a casing 110 and a main body received in the casing 110. The main body of the compressor 100 may include a frame 120, the cylinder 140 fixed to the frame 120, the piston 150 that linearly reciprocates inside the cylinder 140, the drive unit 130 that is fixed to the frame 120 and gives a driving force to the piston 150, and the like. Here, the cylinder 140 and the piston 150 may be referred to as compression units 140 and 150.

The compressor 100 may include a bearing means for reducing a friction between the cylinder 140 and the piston 150. The bearing means may be an oil bearing or a gas bearing. Alternatively, a mechanical bearing may be used as the bearing means.

The main body of the compressor 100 may be elastically supported by support springs 116 and 117 installed at both ends in the casing 110. The support springs 116 and 117 may include a first support spring 116 for supporting the rear of the main body and a second support spring 117 for supporting a front of the main body. The support springs 116 and 117 may include a leaf spring. The support springs 116 and 117 can absorb vibrations and impacts generated by a reciprocating motion of the piston 150 while supporting the internal parts of the main body of the compressor 100.

The casing 110 may define a sealed space. The sealed space may include a receiving space 101 in which the sucked refrigerant is received, an intake space 102 which is filled with the refrigerant before the compression, a compression space 103 in which the refrigerant is compressed, and a discharge space 104 which is filled with the compressed refrigerant.

The refrigerant sucked from the intake pipe 114 connected to the rear side of the casing 110 may be filled in the receiving space 101, and the refrigerant in the intake space 102 communicating with the receiving space 101 may be compressed in the compression space 103, discharged into the discharge space 104, and discharged to the outside through the discharge pipe 115 connected to the front side of the casing 110.

The casing 110 may include the shell 111 formed in a substantially cylindrical shape that is open at both ends and is long in a transverse direction, the first shell cover 112 coupled to the rear side of the shell 111, and the second shell cover 113 coupled to the front side of the shell 111. Here, it can be understood that the front side is the left side of the figure and is a direction in which the compressed refrigerant is discharged, and the rear side is the right side of the figure and is a direction in which the refrigerant is introduced. Further, the first shell cover 112 and the second shell cover 113 may be formed as one body with the shell 11.

The casing 110 may be formed of a thermally conductive material. Hence, heat generated in the inner space of the casing 110 can be quickly dissipated to the outside.

The first shell cover 112 may be coupled to the shell 111 in order to seal the rear of the shell 111, and the intake pipe 114 may be inserted and coupled to the center of the first shell cover 112.

The rear of the main body of the compressor 100 may be elastically supported by the first support spring 116 in the radial direction of the first shell cover 112.

The first support spring 116 may include a circular leaf spring. An edge of the first support spring 116 may be elastically supported by a support bracket 123*a* in a forward direction with respect to a back cover 123. An opened center portion of the first support spring 116 may be supported by an intake guide 116*a* in a rearward direction with respect to the first shell cover 112.

The intake guide 116*a* may have a through passage formed therein. The intake guide 116*a* may be formed in a cylindrical shape. A front outer circumferential surface of the intake guide 116*a* may be coupled to a central opening of the first support spring 116, and a rear end of the intake guide 116*a* may be supported by the first shell cover 112. In this instance, a separate intake support member 116*b* may be interposed between the intake guide 116*a* and an inner surface of the first shell cover 112.

A rear side of the intake guide 116*a* may communicate with the intake pipe 114, and the refrigerant sucked through the intake pipe 114 may pass through the intake guide 116*a* and may be smoothly introduced into a muffler unit 160 to be described below.

A damping member 116*c* may be disposed between the intake guide 116*a* and the intake support member 116*b*. The damping member 116*c* may be formed of a rubber material or the like. Hence, a vibration that may occur in the process of sucking the refrigerant through the intake pipe 114 can be prevented from being transmitted to the first shell cover 112.

The second shell cover 113 may be coupled to the shell 111 to seal the front side of the shell 111, and the discharge pipe 115 may be inserted and coupled through a loop pipe 115*a*. The refrigerant discharged from the compression space 103 may pass through a discharge cover assembly 180 and then may be discharged into the refrigeration cycle through the loop pipe 115*a* and the discharge pipe 115.

A front side of the main body of the compressor 100 may be elastically supported by the second support spring 117 in the radial direction of the shell 111 or the second shell cover 113.

The second support spring 117 may include a circular leaf spring. An opened center portion of the second support spring 117 may be supported by a first support guide 117*b* in a rearward direction with respect to the discharge cover assembly 180. An edge of the second support spring 117 may be supported by a support bracket 117*a* in a forward direction with respect to the inner surface of the shell 111 or the inner circumferential surface of the shell 111 adjacent to the second shell cover 113.

Unlike FIG. 2, the edge of the second support spring 117 may be supported in the forward direction with respect to the inner surface of the shell 111 or the inner circumferential surface of the shell 111 adjacent to the second shell cover 113 through a separate bracket (not shown) coupled to the second shell cover 113.

The first support guide 117b may be formed in a cylindrical shape. A cross section of the first support guide 117 may have a plurality of diameters. A front side of the first support guide 117 may be inserted into a central opening of the second support spring 117, and a rear side of the first support guide 117 may be inserted into a central opening of the discharge cover assembly 180. A support cover 117c may be coupled to the front side of the first support guide 117b with the second support spring 117 interposed therebetween. A cup-shaped second support guide 117d that is recessed forward may be coupled to the front side of the support cover 117c. A cup-shaped third support guide 117e that corresponds to the second support guide 117d and is recessed rearward may be coupled to the inside of the second shell cover 113. The second support guide 117d may be inserted into the third support guide 117e and may be supported in the axial direction and/or the radial direction. In this instance, a gap may be formed between the second support guide 117d and the third support guide 117e.

The frame 120 may include a body portion 121 supporting the outer circumferential surface of the cylinder 140, and a first flange portion 122 that is connected to one side of the body portion 121 and supports the drive unit 130. The frame 120 may be elastically supported with respect to the casing 110 by the first and second support springs 116 and 117 together with the drive unit 130 and the cylinder 140.

The body portion 121 may wrap the outer circumferential surface of the cylinder 140. The body portion 121 may be formed in a cylindrical shape. The first flange portion 122 may extend from a front end of the body portion 121 in the radial direction.

The cylinder 140 may be coupled to an inner circumferential surface of the body portion 121. An inner stator 134 may be coupled to an outer circumferential surface of the body portion 121. For example, the cylinder 140 may be pressed and fitted to the inner circumferential surface of the body portion 121, and the inner stator 134 may be fixed using a separate fixing ring (not shown).

An outer stator 131 may be coupled to a rear surface of the first flange portion 122, and the discharge cover assembly 180 may be coupled to a front surface of the first flange portion 122. For example, the outer stator 131 and the discharge cover assembly 180 may be fixed through a mechanical coupling means.

On one side of the front surface of the first flange portion 122, a bearing inlet groove 125a forming a part of the gas bearing may be formed, a bearing communication hole 125b penetrating from the bearing inlet groove 125a to the inner circumferential surface of the body portion 121 may be formed, and a gas groove 125c communicating with the bearing communication hole 125b may be formed on the inner circumferential surface of the body portion 121.

The bearing inlet groove 125a may be recessed to a predetermined depth in the axial direction. The bearing communication hole 125b is a hole having a smaller cross-sectional area than the bearing inlet groove 125a and may be inclined toward the inner circumferential surface of the body portion 121. The gas groove 125c may be formed in an annular shape having a predetermined depth and an axial length on the inner circumferential surface of the body portion 121. Alternatively, the gas groove 125c may be formed on the outer circumferential surface of the cylinder 140 in contact with the inner circumferential surface of the body portion 121, or formed on both the inner circumferential surface of the body portion 121 and the outer circumferential surface of the cylinder 140.

In addition, a gas inlet 142 corresponding to the gas groove 125c may be formed on the outer circumferential surface of the cylinder 140. The gas inlet 142 forms a kind of nozzle in the gas bearing.

The frame 120 and the cylinder 140 may be formed of aluminum or an aluminum alloy material.

The cylinder 140 may be formed in a cylindrical shape in which both ends are opened. The piston 150 may be inserted through a rear end of the cylinder 140. A front end of the cylinder 140 may be closed via a discharge valve assembly 170. The compression space 103 may be formed between the cylinder 140, a front end of the piston 150, and the discharge valve assembly 170. Here, the front end of the piston 150 may be referred to as a head portion 151. The volume of the compression space 103 increases when the piston 150 moves backward, and decreases as the piston 150 moves forward. That is, the refrigerant introduced into the compression space 103 may be compressed while the piston 150 moves forward, and may be discharged through the discharge valve assembly 170.

The cylinder 140 may include a second flange portion 141 disposed at the front end. The second flange portion 141 may bend to the outside of the cylinder 140. The second flange portion 141 may extend in an outer circumferential direction of the cylinder 140. The second flange portion 141 of the cylinder 140 may be coupled to the frame 120. For example, the front end of the frame 120 may include a flange groove corresponding to the second flange portion 141 of the cylinder 140, and the second flange portion 141 of the cylinder 140 may be inserted into the flange groove and coupled through a coupling member.

A gas bearing means may be provided to supply a discharge gas to a gap between the outer circumferential surface of the piston 150 and the outer circumferential surface of the cylinder 140 and lubricate between the cylinder 140 and the piston 150 with gas. The discharge gas between the cylinder 140 and the piston 150 may provide a levitation force to the piston 150 to reduce a friction generated between the piston 150 and the cylinder 140.

For example, the cylinder 140 may include the gas inlet 142. The gas inlet 142 may communicate with the gas groove 125c formed on the inner circumferential surface of the body portion 121. The gas inlet 142 may pass through the cylinder 140 in the radial direction. The gas inlet 142 may guide the compressed refrigerant introduced in the gas groove 125c between the inner circumferential surface of the cylinder 140 and the outer circumferential surface of the piston 150. Alternatively, the gas groove 125c may be formed on the outer circumferential surface of the cylinder 140 in consideration of the convenience of processing.

An entrance of the gas inlet 142 may be formed relatively widely, and an exit of the gas inlet 142 may be formed as a fine through hole to serve as a nozzle. The entrance of the gas inlet 142 may further include a filter (not shown) blocking the inflow of foreign matter. The filter may be a metal mesh filter, or may be formed by winding a member such as fine thread.

The plurality of gas inlets 142 may be independently formed. Alternatively, the entrance of the gas inlet 142 may be formed as an annular groove, and a plurality of exits may be formed along the annular groove at regular intervals. The gas inlet 142 may be formed only at the front side based on the axial direction center of the cylinder 140. On the contrary, the gas inlet 142 may be formed at the rear side based on the axial direction center of the cylinder 140 in consideration of the sagging of the piston 150.

The piston 150 is inserted into the opened rear end of the cylinder 140 and is provided to seal the rear of the compression space 103.

The piston 150 may include a head portion 151 and a guide portion 152. The head portion 151 may be formed in a disc shape. The head portion 151 may be partially open. The head portion 151 may partition the compression space 103. The guide portion 152 may extend rearward from an outer circumferential surface of the head portion 151. The guide portion 152 may be formed in a cylindrical shape. The inside of the guide portion 152 may be empty, and a front of the guide portion 152 may be partially sealed by the head portion 151. A rear of the guide portion 152 may be opened and connected to the muffler unit 160. The head portion 151 may be provided as a separate member coupled to the guide portion 152. Alternatively, the head portion 151 and the guide portion 152 may be formed as one body.

The piston 150 may include an intake port 154. The intake port 154 may pass through the head portion 151. The intake port 154 may communicate with the intake space 102 and the compression space 103 inside the piston 150. For example, the refrigerant flowing from the receiving space 101 to the intake space 102 in the piston 150 may pass through the intake port 154 and may be sucked into the compression space 103 between the piston 150 and the cylinder 140.

The intake port 154 may extend in the axial direction of the piston 150. The intake port 154 may be inclined in the axial direction of the piston 150. For example, the intake port 154 may extend to be inclined in a direction away from the central axis as it goes to the rear of the piston 150.

A cross section of the intake port 154 may be formed in a circular shape. The intake port 154 may have a constant inner diameter. In contrast, the intake port 154 may be formed as a long hole in which an opening extends in the radial direction of the head portion 151, or may be formed such that the inner diameter becomes larger as it goes to the rear.

The plurality of intake ports 154 may be formed in at least one of the radial direction and the circumferential direction of the head portion 151.

The head portion 151 of the piston 150 adjacent to the compression space 103 may be equipped with an intake valve 155 for selectively opening and closing the intake port 154. The intake valve 155 may operate by elastic deformation to open or close the intake port 154. That is, the intake valve 155 may be elastically deformed to open the intake port 154 by the pressure of the refrigerant flowing into the compression space 103 through the intake port 154.

The piston 150 may be connected to a mover 135. The mover 135 may reciprocate forward and backward according to the movement of the piston 150. The inner stator 134 and the cylinder 140 may be disposed between the mover 135 and the piston 150. The mover 135 and the piston 150 may be connected to each other by a magnet frame 136 that is formed by detouring the cylinder 140 and the inner stator 134 to the rear.

The muffler unit 160 may be coupled to the rear of the piston 150 to reduce a noise generated in the process of sucking the refrigerant into the piston 150. The refrigerant sucked through the intake pipe 114 may flow into the intake space 102 in the piston 150 via the muffler unit 160.

The muffler unit 160 may include an intake muffler 161 communicating with the receiving space 101 of the casing 110, and an inner guide 162 that is connected to a front of the intake muffler 161 and guides the refrigerant to the intake port 154.

The intake muffler 161 may be positioned behind the piston 150. A rear opening of the intake muffler 161 may be disposed adjacent to the intake pipe 114, and a front end of the intake muffler 161 may be coupled to the rear of the piston 150. The intake muffler 161 may have a flow path formed in the axial direction to guide the refrigerant in the receiving space 101 to the intake space 102 inside the piston 150.

The inside of the intake muffler 161 may include a plurality of noise spaces partitioned by a baffle. The intake muffler 161 may be formed by combining two or more members. For example, a second intake muffler may be press-coupled to the inside of a first intake muffler to form a plurality of noise spaces. In addition, the intake muffler 161 may be formed of a plastic material in consideration of weight or insulation property.

One side of the inner guide 162 may communicate with the noise space of the intake muffler 161, and other side may be deeply inserted into the piston 150. The inner guide 162 may be formed in a pipe shape. Both ends of the inner guide 162 may have the same inner diameter. The inner guide 162 may be formed in a cylindrical shape. Alternatively, an inner diameter of a front end that is a discharge side of the inner guide 162 may be greater than an inner diameter of a rear end opposite the front end.

The intake muffler 161 and the inner guide 162 may be provided in various shapes and may adjust the pressure of the refrigerant passing through the muffler unit 160. The intake muffler 161 and the inner guide 162 may be formed as one body.

The discharge valve assembly 170 may include a discharge valve 171 and a valve spring 172 that is provided on a front side of the discharge valve 171 to elastically support the discharge valve 171. The discharge valve assembly 170 may selectively discharge the compressed refrigerant in the compression space 103. Here, the compression space 103 means a space between the intake valve 155 and the discharge valve 171.

The discharge valve 171 may be disposed to be supportable on the front surface of the cylinder 140. The discharge valve 171 may selectively open and close the front opening of the cylinder 140. The discharge valve 171 may operate by elastic deformation to open or close the compression space 103. The discharge valve 171 may be elastically deformed to open the compression space 103 by the pressure of the refrigerant flowing into the discharge space 104 through the compression space 103. For example, the compression space 103 may maintain a sealed state while the discharge valve 171 is supported on the front surface of the cylinder 140, and the compressed refrigerant of the compression space 103 may be discharged into an opened space in a state where the discharge valve 171 is spaced apart from the front surface of the cylinder 140.

The valve spring 172 may be provided between the discharge valve 171 and the discharge cover assembly 180 to provide an elastic force in the axial direction. The valve spring 172 may be provided as a compression coil spring, or may be provided as a leaf spring in consideration of an occupied space or reliability.

When the pressure of the compression space 103 is equal to or greater than a discharge pressure, the valve spring 172 may open the discharge valve 171 while deforming forward, and the refrigerant may be discharged from the compression space 103 and discharged into a first discharge space 104a of the discharge cover assembly 180. When the discharge of the refrigerant is completed, the valve spring 172 provides a restoring force to the discharge valve 171 and thus can allow the discharge valve 171 to be closed.

A process of introducing the refrigerant into the compression space 103 through the intake valve 155 and discharging the refrigerant of the compression space 103 into the discharge space 104 through the discharge valve 171 is described as follows.

In the process in which the piston 150 linearly reciprocates in the cylinder 140, when the pressure of the compression space 103 is equal to or less than a predetermined intake pressure, the intake valve 155 is opened and thus the refrigerant is sucked into a compression space 103. On the other hand, when the pressure of the compression space 103 exceeds the predetermined intake pressure, the refrigerant of the compression space 103 is compressed in a state in which the intake valve 155 is closed.

When the pressure of the compression space 103 is equal to or greater than the predetermined intake pressure, the valve spring 172 deforms forward and opens the discharge valve 171 connected to the valve spring 172, and the refrigerant is discharged from the compression space 103 to the discharge space 104 of the discharge cover assembly 180. When the discharge of the refrigerant is completed, the valve spring 172 provides a restoring force to the discharge valve 171 and allows the discharge valve 171 to be closed, thereby sealing a front of the compression space 103.

The discharge cover assembly 180 is installed at the front of the compression space 103, forms a discharge space 104 for receiving the refrigerant discharged from the compression space 103, and is coupled to a front of the frame 120 to thereby reduce a noise generated in the process of discharging the refrigerant from the compression space 103. The discharge cover assembly 180 may be coupled to a front of the first flange portion 122 of the frame 120 while receiving the discharge valve assembly 170. For example, the discharge cover assembly 180 may be coupled to the first flange portion 122 through a mechanical coupling member.

An O-ring 166 may be provided between the discharge cover assembly 180 and the frame 120 to prevent the refrigerant in a gasket 165 for thermal insulation and the discharge space 104 from leaking.

The discharge cover assembly 180 may be formed of a thermally conductive material. Therefore, when a high temperature refrigerant is introduced into the discharge cover assembly 180, heat of the refrigerant may be transferred to the casing 110 through the discharge cover assembly 180 and dissipated to the outside of the compressor.

The discharge cover assembly 180 may include one discharge cover, or may be arranged so that a plurality of discharge covers sequentially communicate with each other. When the discharge cover assembly 180 is provided with the plurality of discharge covers, the discharge space 104 may include a plurality of spaces partitioned by the respective discharge covers. The plurality of spaces may be disposed in a front-rear direction and may communicate with each other.

For example, when there are three discharge covers, the discharge space 104 may include a first discharge space 104a between the frame 120 and a first discharge cover 181 coupled to the front side of the frame 120, a second discharge space 104b between the first discharge cover 181 and a second discharge cover 182 that communicates with the first discharge space 104a and is coupled to a front side of the first discharge cover 181, and a third discharge space 104c between the second discharge cover 182 and a third discharge cover 183 that communicates with the second discharge space 104b and is coupled to a front side of the second discharge cover 182.

The first discharge space 104a may selectively communicate with the compression space 103 by the discharge valve 171, the second discharge space 104b may communicate with the first discharge space 104a, and the third discharge space 104c may communicate with the second discharge space 104b. Hence, as the refrigerant discharged from the compression space 103 sequentially passes through the first discharge space 104a, the second discharge space 104b, and the third discharge space 104c, a discharge noise can be reduced, and the refrigerant can be discharged to the outside of the casing 110 through the loop pipe 115a and the discharge pipe 115 communicating with the third discharge cover 183.

The drive unit 130 may include the outer stator 131 that is disposed between the shell 111 and the frame 120 and surrounds the body portion 121 of the frame 120, the inner stator 134 that is disposed between the outer stator 131 and the cylinder 140 and surrounds the cylinder 140, and the mover 135 disposed between the outer stator 131 and the inner stator 134.

The outer stator 131 may be coupled to the rear of the first flange portion 122 of the frame 120, and the inner stator 134 may be coupled to the outer circumferential surface of the body portion 121 of the frame 120. The inner stator 134 may be spaced apart from the inside of the outer stator 131, and the mover 135 may be disposed in a space between the outer stator 131 and the inner stator 134.

The outer stator 131 may be equipped with a winding coil, and the mover 135 may include a permanent magnet. The permanent magnet may consist of a single magnet with one pole or configured by combining a plurality of magnets with three poles.

The outer stator 131 may include a coil winding 132 surrounding the axial direction in the circumferential direction, and a stator core 133 stacked while surrounding the coil winding 132. The coil winding 132 may include a hollow cylindrical bobbin 132a and a coil 132b wound in a circumferential direction of the bobbin 132a. A cross section of the coil 132b may be formed in a circular or polygonal shape, for example, may have a hexagonal shape. In the stator core 133, a plurality of lamination sheets may be laminated radially, or a plurality of lamination blocks may be laminated along the circumferential direction.

The front side of the outer stator 131 may be supported by the first flange portion 122 of the frame 120, and the rear side thereof may be supported by a stator cover 137. For example, the stator cover 137 may be provided in a hollow disc shape, a front surface of the stator cover 137 may be supported by the outer stator 131, and a rear surface thereof may be supported by a resonant spring 118.

The inner stator 134 may be configured by stacking a plurality of laminations on the outer circumferential surface of the body portion 121 of the frame 120 in the circumferential direction.

One side of the mover 135 may be coupled to and supported by the magnet frame 136. The magnet frame 136 has a substantially cylindrical shape and may be disposed to be inserted into a space between the outer stator 131 and the inner stator 134. The magnet frame 136 may be coupled to the rear side of the piston 150 to move together with the piston 150.

As an example, a rear end of the magnet frame 136 is bent and extended inward in the radial direction to form a first coupling portion 136a, and the first coupling portion 136a may be coupled to a third flange portion 153 formed in the rear of the piston 150. The first coupling portion 136a of the magnet frame 136 and the third flange portion 153 of the piston 150 may be coupled through a mechanical coupling member.

A fourth flange portion 161a in front of the intake muffler 161 may be interposed between the third flange portion 153 of the piston 150 and the first coupling portion 136a of the magnet frame 136. Thus, the piston 150, the muffler unit 160, and the mover 135 can linearly reciprocate together in a combined state.

When a current is applied to the drive unit 130, a magnetic flux may be formed in the winding coil, and an electromagnetic force may occur by an interaction between the magnetic flux formed in the winding coil of the outer stator 131 and a magnetic flux formed by the permanent magnet of the mover 135 to move the mover 135. At the same time as the reciprocating movement of the mover 135 in the axial direction, the piston 150 connected to the magnet frame 136 may also reciprocate integrally with the mover 135 in the axial direction.

The drive unit 130 and the compression units 140 and 150 may be supported by the support springs 116 and 117 and the resonant spring 118 in the axial direction.

The resonant spring 118 amplifies the vibration implemented by the reciprocating motion of the mover 135 and the piston 150 and thus can achieve an effective compression of the refrigerant. More specifically, the resonant spring 118 may be adjusted to a frequency corresponding to a natural frequency of the piston 150 and may allow the piston 150 to perform a resonant motion. Further, the resonant spring 118 generates a stable movement of the piston 150 and thus can reduce the generation of vibration and noise.

The resonant spring 118 may be a coil spring extending in the axial direction. Both ends of the resonant spring 118 may be connected to a vibrating body and a fixed body, respectively. For example, one end of the resonant spring 118 may be connected to the magnet frame 136, and the other end may be connected to the back cover 123. Therefore, the resonant spring 118 may be elastically deformed between the vibrating body vibrating at one end and the fixed body fixed to the other end.

A natural frequency of the resonant spring 118 may be designed to match a resonant frequency of the mover 135 and the piston 150 during the operation of the compressor 100, thereby amplifying the reciprocating motion of the piston 150. However, because the back cover 123 provided as the fixing body is elastically supported by the first support spring 116 in the casing 110, the back cover 123 may not be strictly fixed.

The resonant spring 118 may include a first resonant spring 118a supported on the rear side and a second resonant spring 118b supported on the front side based on a spring supporter 119.

The spring supporter 119 may include a body portion 119a surrounding the intake muffler 161, a second coupling portion 119b that is bent from a front of the body portion 119a in the inward radial direction, and a support portion 119c that is bent from the rear of the body portion 119a in the outward radial direction.

A front surface of the second coupling portion 119b of the spring supporter 119 may be supported by the first coupling portion 136a of the magnet frame 136. An inner diameter of the second coupling portion 119b of the spring supporter 119 may cover an outer diameter of the intake muffler 161. For example, the second coupling portion 119b of the spring supporter 119, the first coupling portion 136a of the magnet frame 136, and the third flange portion 153 of the piston 150 may be sequentially disposed and then integrally coupled through a mechanical member. In this instance, the description that the fourth flange portion 161a of the intake muffler 161 can be interposed between the third flange portion 153 of the piston 150 and the first coupling portion 136a of the magnet frame 136, and they can be fixed together is the same as that described above.

The first resonant spring 118a may be disposed between a front surface of the back cover 123 and a rear surface of the spring supporter 119. The second resonant spring 118b may be disposed between a rear surface of the stator cover 137 and a front surface of the spring supporter 119.

A plurality of first and second resonant springs 118a and 118b may be disposed in the circumferential direction of the central axis. The first resonant springs 118a and the second resonant springs 118b may be disposed parallel to each other in the axial direction, or may be alternately disposed. The first and second resonant springs 118a and 118b may be disposed at regular intervals in the radial direction of the central axis. For example, three first resonant springs 118a and three second resonant springs 118b may be provided and may be disposed at intervals of 120 degrees in the radial direction of the central axis.

The compressor 100 may include a plurality of sealing members that can increase a coupling force between the frame 120 and the components around the frame 120.

For example, the plurality of sealing members may include a first sealing member that is interposed at a portion where the frame 120 and the discharge cover assembly 180 are coupled and is inserted into an installation groove provided at the front end of the frame 120, and a second sealing member that is provided at a portion at which the frame 120 and the cylinder 140 are coupled and is inserted into an installation groove provided at an outer surface of the cylinder 140. The second sealing member can prevent the refrigerant of the gas groove 125c between the inner circumferential surface of the frame 120 and the outer circumferential surface of the cylinder 140 from leaking to the outside, and can increase a coupling force between the frame 120 and the cylinder 140. The plurality of sealing members may further include a third sealing member that is provided at a portion at which the frame 120 and the inner stator 134 are coupled and is inserted into an installation groove provided at the outer surface of the frame 120. Here, the first to third sealing members may have a ring shape.

An operation of the linear compressor 100 described above is as follows.

First, when a current is applied to the drive unit 130, a magnetic flux may be formed in the outer stator 131 by the current flowing in the coil 132b. The magnetic flux formed in the outer stator 131 may generate an electromagnetic force, and the mover 135 including the permanent magnet may linearly reciprocate by the generated electromagnetic force. The electromagnetic force may be alternately generated in a direction (forward direction) in which the piston 150 is directed toward a top dead center (TDC) during a compression stroke, and in a direction (rearward direction) in which the piston 150 is directed toward a bottom dead center (BDC) during an intake stroke. That is, the drive unit 130 may generate a thrust which is a force for pushing the mover 135 and the piston 150 in a moving direction.

The piston 150 linearly reciprocating inside the cylinder 140 may repeatedly increase or reduce volume of the compression space 103.

When the piston 150 moves in a direction (rearward direction) of increasing the volume of the compression space 103, a pressure of the compression space 103 may decrease. Hence, the intake valve 155 mounted in front of the piston 150 is opened, and the refrigerant remaining in the intake space 102 may be sucked into the compression space 103 along the intake port 154. The intake stroke may be performed until the piston 150 is positioned in the bottom dead center by maximally increasing the volume of the compression space 103.

The piston 150 reaching the bottom dead center may perform the compression stroke while switching its motion direction and moving in a direction (forward direction) of reducing the volume of the compression space 103. As the pressure of the compression space 103 increases during the compression stroke, the sucked refrigerant may be compressed. When the pressure of the compression space 103 reaches a setting pressure, the discharge valve 171 is pushed out by the pressure of the compression space 103 and is opened from the cylinder 140, and the refrigerant can be discharged into the discharge space 104 through a separation space. The compression stroke can continue while the piston 150 moves to the top dead center at which the volume of the compression space 103 is minimized.

As the intake stroke and the compression stroke of the piston 150 are repeated, the refrigerant introduced into the receiving space 101 inside the compressor 100 through the intake pipe 114 may be introduced into the intake space 102 in the piston 150 by sequentially passing the intake guide 116a, the intake muffler 161, and the inner guide 162, and the refrigerant of the intake space 102 may be introduced into the compression space 103 in the cylinder 140 during the intake stroke of the piston 150. After the refrigerant of the compression space 103 is compressed and discharged into the discharge space 104 during the compression stroke of the piston 150, the refrigerant may be discharged to the outside of the compressor 100 via the loop pipe 115a and the discharge pipe 115.

Figure 3:
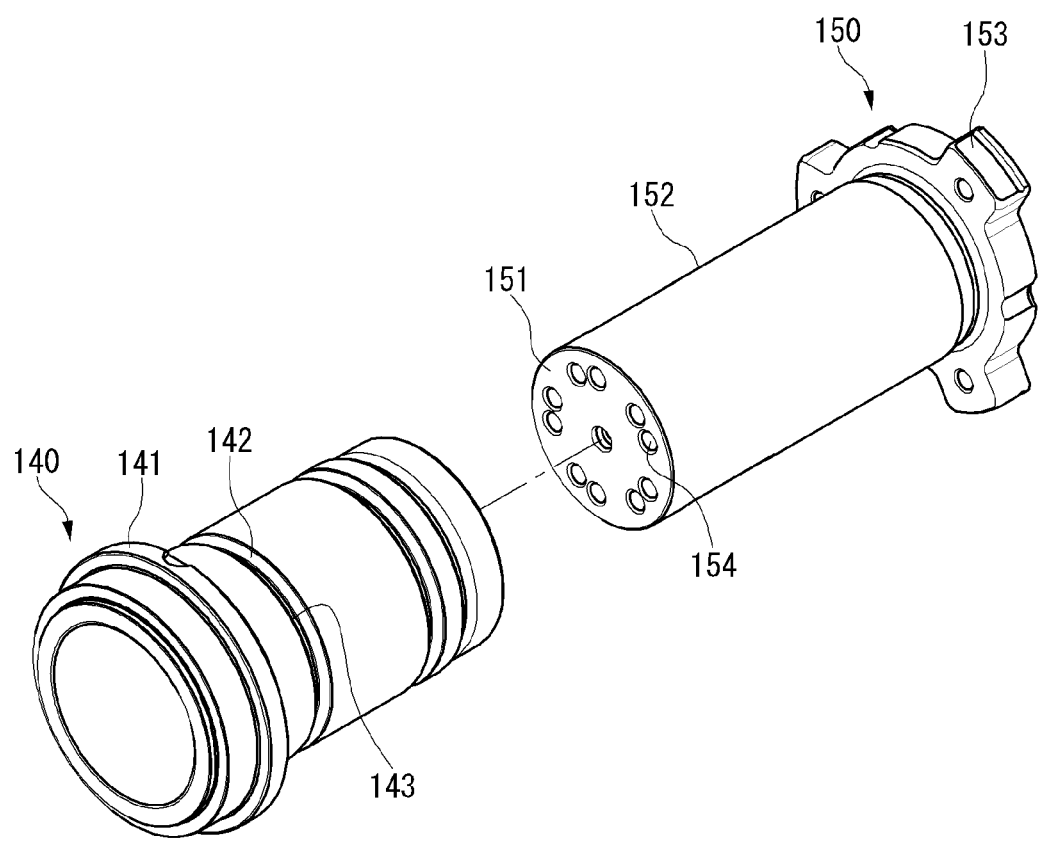
FIG. 3 is an exploded perspective view of a cylinder and a piston according to an embodiment of the present disclosure.
Figure 4:
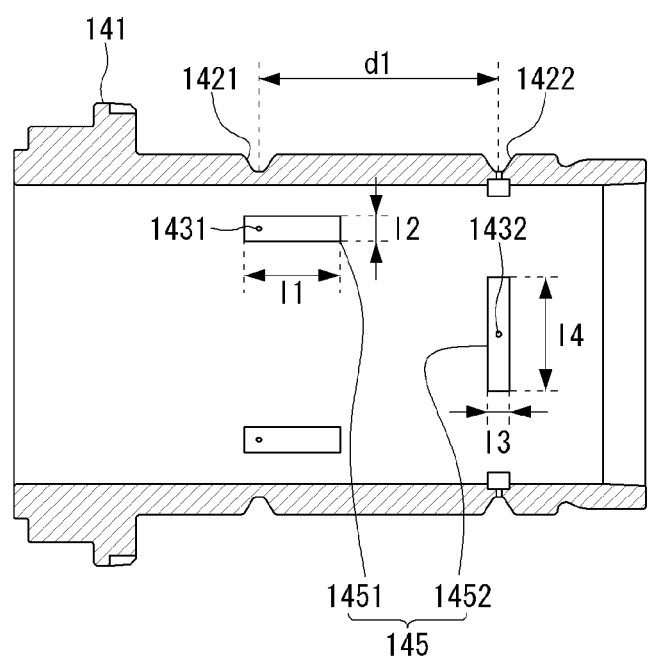
FIG. 4 is a cross-sectional view of a cylinder according to an embodiment of the present disclosure.

FIG. 3 is an exploded perspective view of a cylinder and a piston according to an embodiment of the present disclosure. FIG. 4 is a cross-sectional view of a cylinder according to an embodiment of the present disclosure. FIGS. 5 to 9 are modified implementations of a first recess according to an embodiment of the present disclosure. FIG. 10 is a graph illustrating a minimum gap between a cylinder and a piston according to a related art and an embodiment of the present disclosure.

Referring to FIGS. 3 to 9, the linear compressor 100 according to an embodiment of the present disclosure may include the cylinder 140 and the piston 150, and does not exclude additional components. The detailed configuration of the cylinder 140 and the piston 150, that are not described below, can be understood to be substantially the same as the detailed configuration of the cylinder 140 and the piston 150 described with reference to FIG. 2.

The cylinder 140 may include the gas inlet 142, a supply port 143, and a recess 145.

The gas inlet 142 may be formed on the outer circumferential surface of the cylinder 140. The gas inlet 142 may have a groove shape formed on the outer circumferential surface of the cylinder 140. The gas bearing may have a nozzle shape in which a cross-sectional area decreases as it goes to a central area of the cylinder 140. The gas inlet 142 may be formed in a circular strip shape. The gas inlet 142 may communicate with the supply port 143.

The gas inlet 142 may include a plurality of gas inlets 1421 and 1422. The gas inlet 142 may include a first gas inlet 1421 and a second gas inlet 1422 disposed in the rear of the first gas inlet 1421. In an embodiment of the present disclosure, the two gas inlets 142 are provided by way of example, but the present disclosure is not limited thereto. For example, three or more gas inlets may be used.

The supply port 143 may pass through the cylinder 140 in the radial direction. The supply port 143 may communicate with the gas inlet 142. The supply port 143 may communicate with the recess 145. The supply port 143 may have a hole shape passing through the outer circumferential surface and the inner circumferential surface of the cylinder 140. The supply port 143 may guide a refrigerant, that is introduced into the gas groove 125c and passes through the gas inlet 142, to the recess 145.

The supply port 143 may include a plurality of supply ports 1431 and 1432. The supply port 143 may include a first supply port 1431 and a second supply port 1432 disposed in the rear of the first supply port 1431. The first supply port 1431 may communicate with the first gas inlet 1421. The second supply port 1432 may communicate with the second gas inlet 1422. The first supply port 1431 may communicate with a first recess 1451. The second supply port 1432 may communicate with a second recess 1452. The first supply port 1431 may include a plurality of first supply ports 1431 that are spaced form each other in the circumferential direction of the cylinder 140. The second supply port 1432 may include a plurality of second supply ports 1432 that are spaced form each other in the circumferential direction of the cylinder 140.

The recess 145 may be formed on the inner circumferential surface of the cylinder 140. The recess 145 may be concavely formed on the inner circumferential surface of the cylinder 140. The recess 145 may communicate with the supply port 143. The recess 145 may face the piston 150. The recess 145 may face the outer circumferential surface of the piston 150.

The recess 145 may include a plurality of recesses 1451 and 1452. The recess 145 may include a first recess 1451 and a second recess 1452 disposed in the rear of the first recess 1451. The first recess 1451 may communicate with the first supply port 1431. The second recess 1452 may communicate with the second supply port 1432. The first recess 1451 may include a plurality of first recesses 1451 that are spaced form each other in the circumferential direction of the cylinder 140. The plurality of first recesses 1451 may communicate with the plurality of first supply ports 1431, respectively. The second recess 1452 may include a plurality of second recesses 1452 that are spaced form each other in the circumferential direction of the cylinder 140. The plurality of second recesses 1452 may communicate with the plurality of second supply ports 1432, respectively.

Referring to FIG. 4, the first recess 1451 and the second recess 1452 may be formed in different shapes. More specifically, a ratio of a circumferential direction length l2 to an axial direction length l1 of the first recess 1451 may be different from a ratio of a circumferential direction length l4 to an axial direction length l3 of the second recess 1452. For example, the axial direction length l1 of the first recess 1451 may be greater than the circumferential direction length l2 of the first recess 1451. Further, the axial direction length l3 of the second recess 1452 may be less than the circumferential direction length l4 of the second recess 1452. The axial direction length l1 of the first recess 1451 may be greater than the axial direction length l3 of the second recess 1452. The circumferential direction length l2 of the first recess 1451 may be less than the circumferential direction length l4 of the second recess 1452.

Since the first recess 1451 and the second recess 1452 are formed in different shapes, a restoring moment of the front area of the piston 150 can be further improved compared to the existing one. Hence, since a collision between the piston 150 and the cylinder 140 is prevented by increasing a minimum gap between the piston 150 and the cylinder 140 during the compression stroke of the linear compressor 100, reliability of the linear compressor 100 can be improved. In addition, a stable support of the piston 150 with respect to the cylinder 140 can be achieved.

The axial direction length l1 of the first recess 1451 may be equal to or less than ¼ of an axial direction length d1 between the first supply port 1431 and the second supply port 1432. When the axial direction length l1 of the first recess 1451 is greater than the axial direction length l3 of the second recess 1452, the minimum gap between the piston 150 and the cylinder 140 may increase during the compression stroke of the linear compressor 100. In this case, when the axial direction length l1 of the first recess 1451 exceeds ¼ of the axial direction length d1 between the first supply port 1431 and the second supply port 1432, the minimum gap between the piston 150 and the cylinder 140 may decrease again during the compression stroke of the linear compressor 100. Therefore, setting the axial direction length l1 of the first recess 1451 to be equal to or less than ¼ of the axial direction length d1 between the first supply port 1431 and the second supply port 1432 can maximally increase the minimum gap between the piston 150 and the cylinder 140 during the compression stroke of the linear compressor 100.

Figure 5:
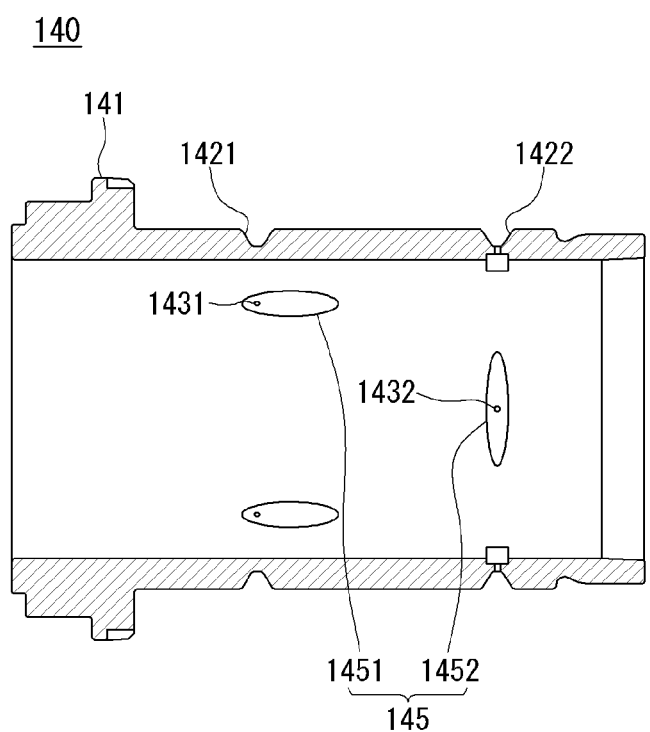
FIGS. 5 to 9 are modified implementations of a first recess according to an embodiment of the present disclosure.

Referring to FIG. 5, the recess 145 of the cylinder 140 may have curvature. More specifically, a cross section of the first recess 1451 and a cross section of the second recess 1452 may have curvature. In this case, clogging of the supply port 143 can be prevented by suppressing the possibility of eddy current that may occur in the recess 145.

Figure 6:
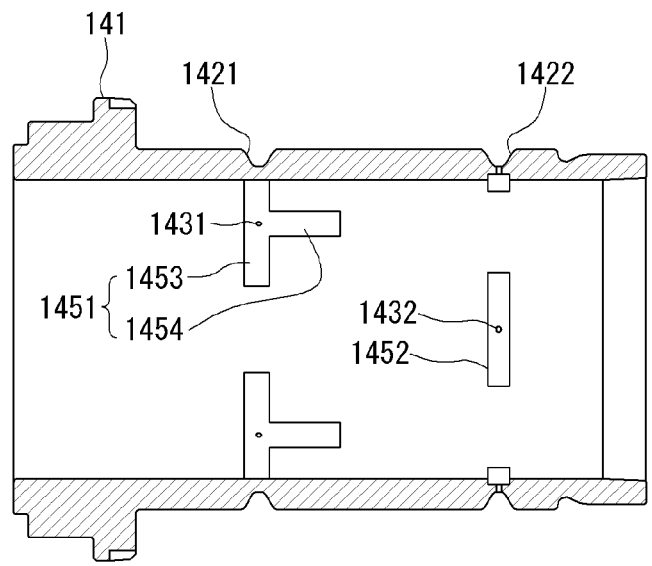
Figure 8:
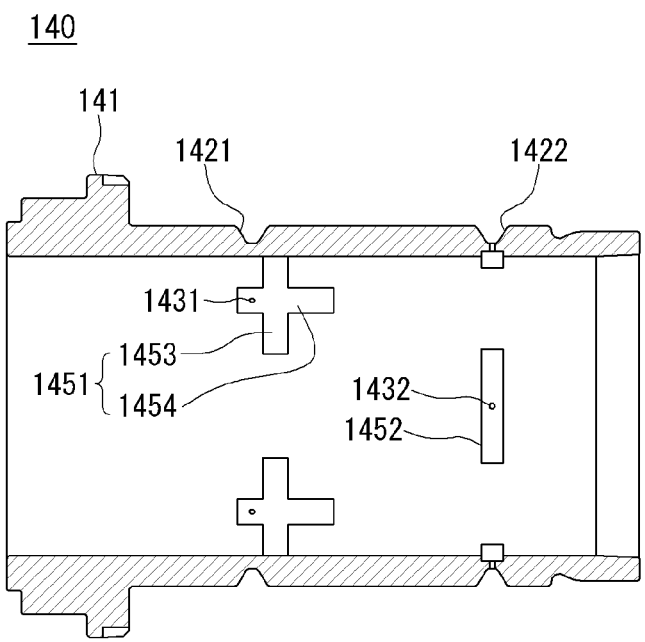

Referring to FIGS. 6 and 8, the first recess 1451 may include a first portion 1453 extended in the circumferential direction, and a second portion 1454 that is connected to the first portion 1453 and extended in the axial direction.

In this instance, a central area of the second portion 1454 in the circumferential direction may be formed to be deeper than other area of the second portion 1454 in the circumferential direction. More specifically, a depth of the central area of the second portion 1454 in the circumferential direction measured from the inner circumferential surface of the cylinder 140 may be greater than a depth of the other area of the second portion 1454 in the circumferential direction measured from the inner circumferential surface of the cylinder 140. Hence, a reduction in compression efficiency caused by a refrigerant leakage can be prevented.

Further, a front area of the second portion 1454 may be formed to be deeper than an axial direction center area of the second portion 1454. More specifically, a depth of the front area of the second portion 1454 measured from the inner circumferential surface of the cylinder 140 may be greater than a depth of the axial direction center area of the second portion 1454 measured from the inner circumferential surface of the cylinder 140. Hence, a reduction in the compression efficiency caused by the refrigerant leakage can be prevented.

A central area of the first portion 1453 in the circumferential direction may be formed to be deeper than other area of the first portion 1453 in the circumferential direction. More specifically, a depth of the central area of the first portion 1453 in the circumferential direction measured from the inner circumferential surface of the cylinder 140 may be greater than a depth of the other area of the first portion 1453 in the circumferential direction measured from the inner circumferential surface of the cylinder 140. Hence, a reduction in the compression efficiency caused by the refrigerant leakage can be prevented.

Figure 7:
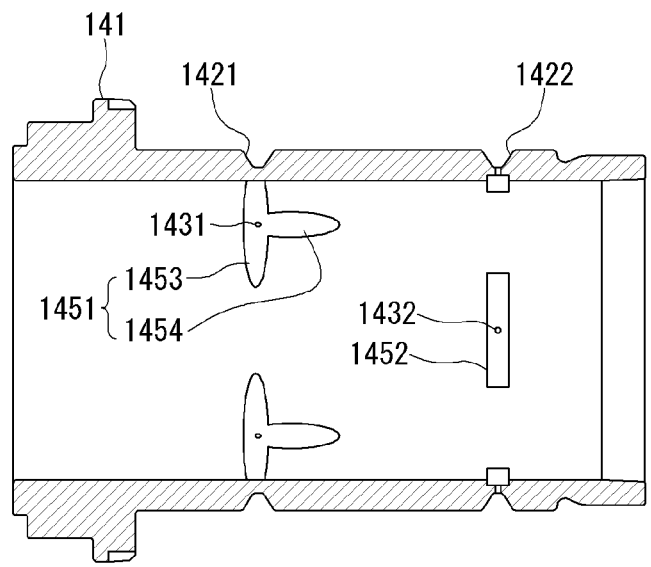
Figure 9:
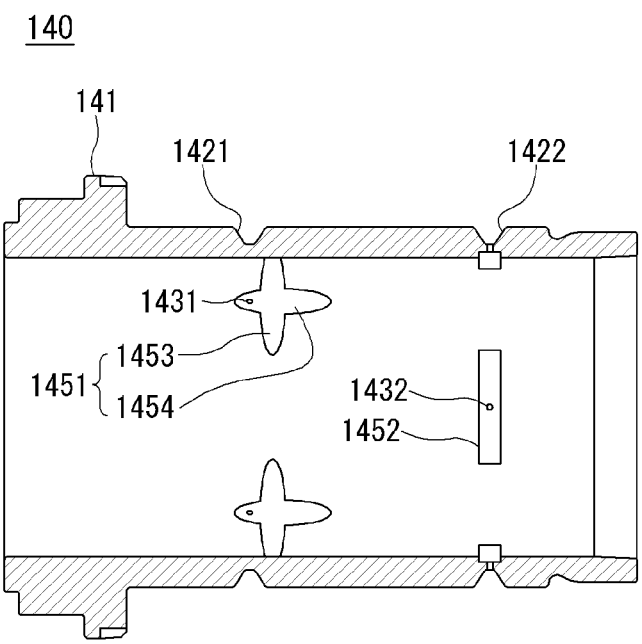
Figure 10:
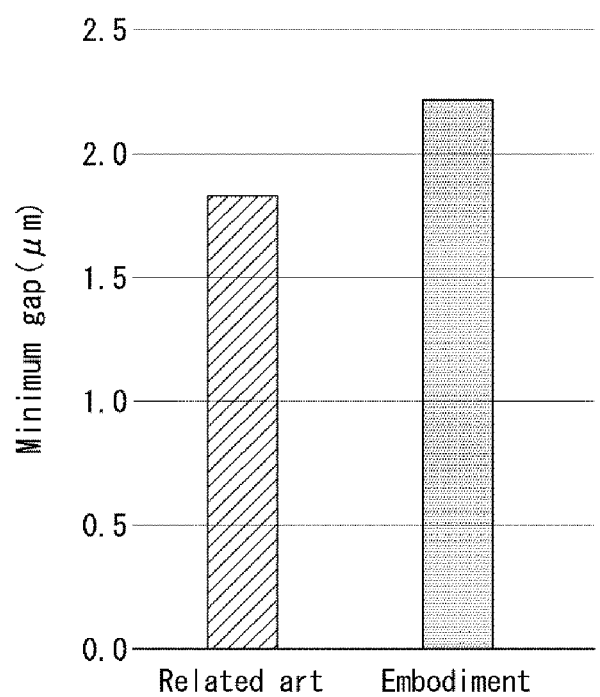
FIG. 10 is a graph illustrating a minimum gap between a cylinder and a piston according to a related art and an embodiment of the present disclosure.

Referring to FIGS. 7 and 9, the first portion 1453 and the second portion 1454 of the first recess 1451 may have curvature. More specifically, a cross section of the first portion 1453 and a cross section of the second portion 1454 may have curvature. In this case, clogging of the supply port 143 can be prevented by suppressing the possibility of eddy current that may occur in the first portion 1453 and the second portion 1454.

It can be seen from FIG. 10 that a minimum gap between the cylinder 140 and the piston 150 of the linear compressor 100 according to an embodiment of the present disclosure is greater than a minimum gap of a related art linear compressor 100. Hence, since a collision between the cylinder 140 and the piston 150 is prevented during the compression stroke of the linear compressor 100, reliability of the linear compressor 100 can be improved. In addition, a stable support of the piston 150 with respect to the cylinder 140 can be achieved.

Figure 11:
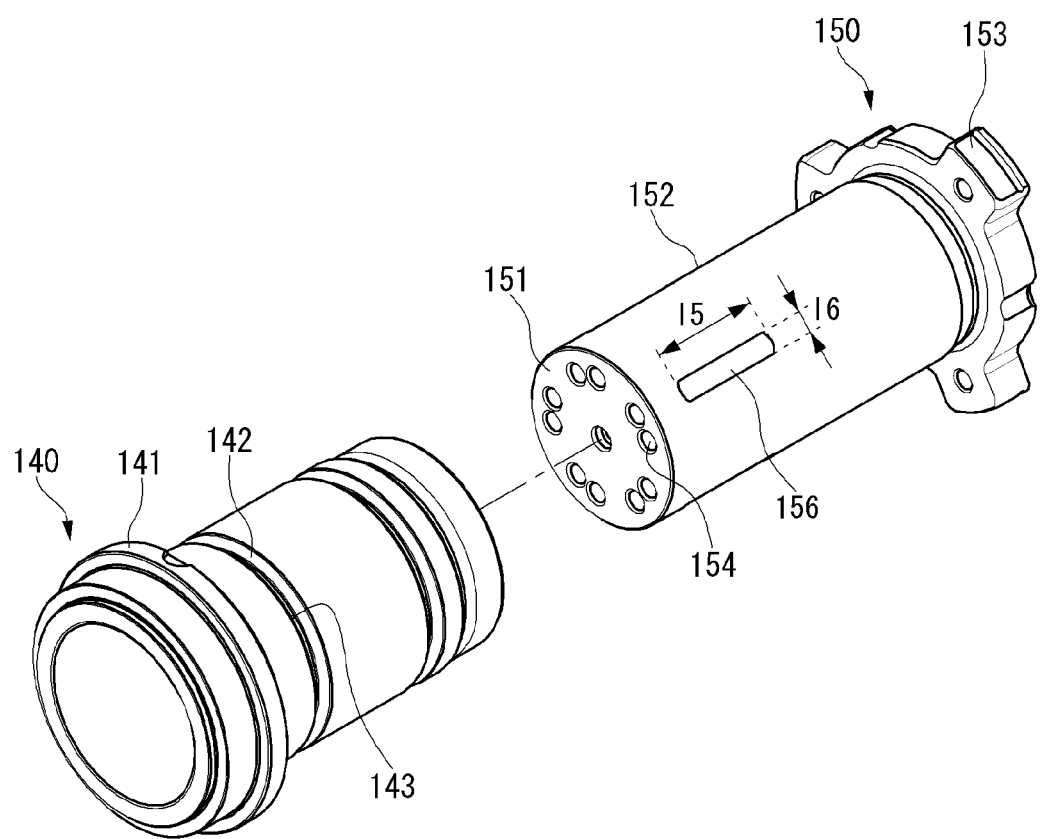
FIG. 11 is an exploded perspective view of a cylinder and a piston according to another embodiment of the present disclosure.
Figure 12:
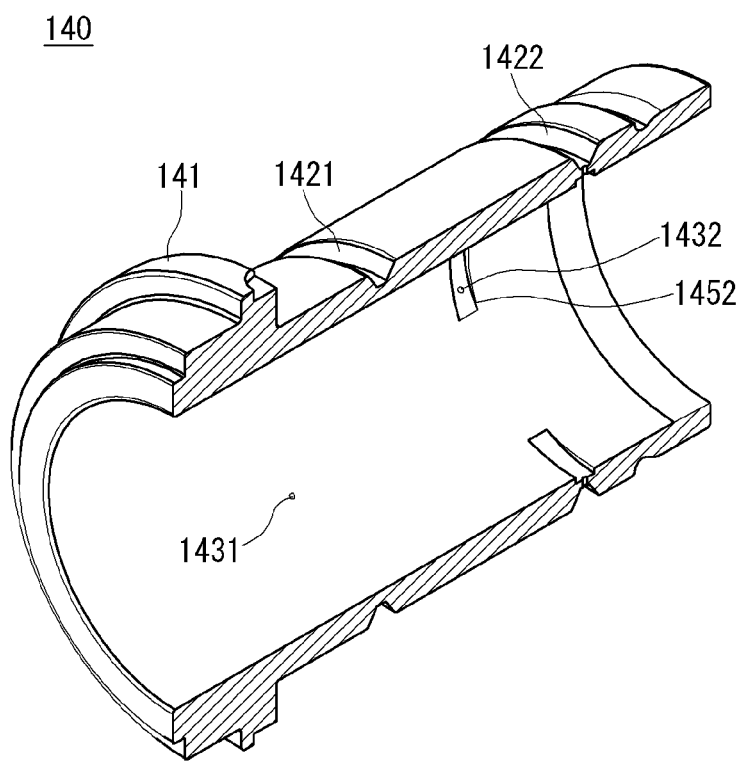
FIG. 12 is a cross-sectional view of a cylinder according to another embodiment of the present disclosure.
Figure 13:
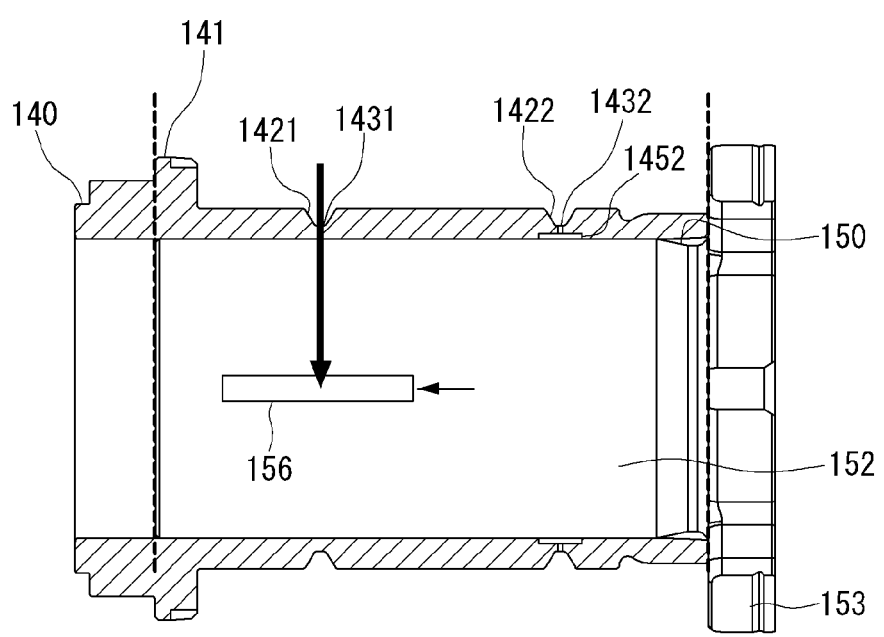
FIGS. 13 and 14 are cross-sectional views of a cylinder and a piston according to another embodiment of the present disclosure.
Figure 14:
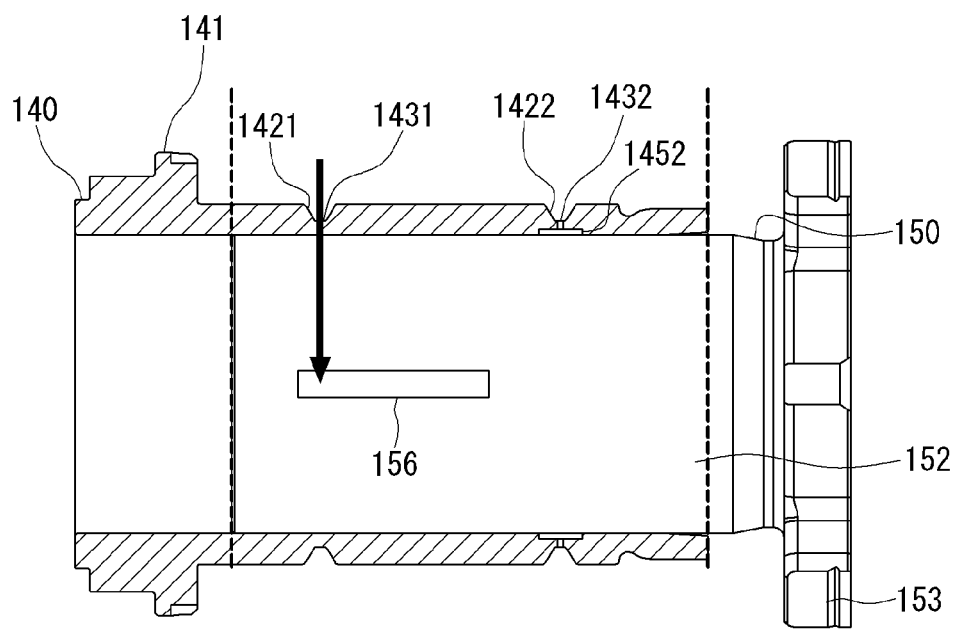

FIG. 11 is an exploded perspective view of a cylinder and a piston according to another embodiment of the present disclosure. FIG. 12 is a cross-sectional view of a cylinder according to another embodiment of the present disclosure. FIGS. 13 and 14 are cross-sectional views of a cylinder and a piston according to another embodiment of the present disclosure. FIGS. 15 to 19 are modified implementations of a first recess according to another embodiment of the present disclosure. FIG. 20 is a graph illustrating a minimum gap between a cylinder and a piston according to a related art and another embodiment of the present disclosure.

Referring to FIGS. 11 to 19, a linear compressor 100 according to another embodiment of the present disclosure may include a cylinder 140 and a piston 150, and does not exclude additional components. The detailed configuration of the cylinder 140 and the piston 150, that are not described below, can be understood to be substantially the same as the detailed configuration of the cylinder 140 and the piston 150 of the linear compressor 100 according to an embodiment of the present disclosure.

A first recess 156 of the linear compressor 100 according to another embodiment of the present disclosure may be formed in the piston 150, unlike the first recess 1451 of the linear compressor 100 according to an embodiment of the present disclosure.

The cylinder 140 may include a gas inlet 142, a supply port 143, and a second recess 1452.

The gas inlet 142 may be formed on an outer circumferential surface of the cylinder 140. The gas inlet 142 may have a groove shape formed on the outer circumferential surface of the cylinder 140. A gas bearing may have a nozzle shape in which a cross-sectional area decreases as it goes to a central area of the cylinder 140. The gas inlet 142 may be formed in a circular strip shape. The gas inlet 142 may communicate with the supply port 143.

The gas inlet 142 may include a plurality of gas inlets 1421 and 1422. The gas inlet 142 may include a first gas inlet 1421 and a second gas inlet 1422 disposed in the rear of the first gas inlet 1421. In another embodiment of the present disclosure, the two gas inlets 142 are provided by way of example, but the present disclosure is not limited thereto. For example, three or more gas inlets may be used.

The supply port 143 may pass through the cylinder 140 in a radial direction. The supply port 143 may communicate with the gas inlet 142. The supply port 143 may communicate with the first and second recesses 156 and 1452. The supply port 143 may have a hole shape passing through the outer circumferential surface and an inner circumferential surface of the cylinder 140. The supply port 143 may guide a refrigerant, that is introduced into a gas groove 125c and passes through the gas inlet 142, to the first and second recesses 156 and 1452.

The supply port 143 may include a plurality of supply ports 1431 and 1432. The supply port 143 may include a first supply port 1431 and a second supply port 1432 disposed in the rear of the first supply port 1431. The first supply port 1431 may communicate with the first gas inlet 1421. The second supply port 1432 may communicate with the second gas inlet 1422. The first supply port 1431 may face the first recess 156. The second supply port 1432 may communicate with the second recess 1452. The first supply port 1431 may include a plurality of first supply ports 1431 that are spaced form each other in a circumferential direction of the cylinder 140. The second supply port 1432 may include a plurality of second supply ports 1432 that are spaced form each other in the circumferential direction of the cylinder 140.

The second recess 1452 may be formed on the inner circumferential surface of the cylinder 140. The second recess 1452 may be disposed in the rear of the first recess 156. The second recess 1452 may be concavely formed on the inner circumferential surface of the cylinder 140. The second recess 1452 may communicate with the second supply port 1432. The second recess 1452 may face the piston 150. The second recess 1452 may face an outer circumferential surface of the piston 150. The second recess 1452 may include a plurality of second recesses 1452 that are spaced form each other in the circumferential direction of the cylinder 140.

The piston 150 may include the first recess 156. The first recess 156 may be disposed in front of the second recess 1452. The first recess 156 may face the first supply port 1431. The first recess 156 may include a plurality of first recesses 156 that are spaced form each other in a circumferential direction of the piston 150. The plurality of first recesses 156 may face the plurality of first supply ports 1431, respectively.

Referring to FIGS. 11 and 12, the first recess 156 and the second recess 1452 may be formed in different shapes. More specifically, a ratio of a circumferential direction length l6 to an axial direction length l5 of the first recess 156 may be different from a ratio of a circumferential direction length l4 to an axial direction length l3 of the second recess 1452. For example, the axial direction length l5 of the first recess 156 may be greater than the circumferential direction length l6 of the first recess 156. Further, the axial direction length l3 of the second recess 1452 may be less than the circumferential direction length l4 of the second recess 1452. The axial direction length l5 of the first recess 156 may be greater than the axial direction length l3 of the second recess 1452. The circumferential direction length l6 of the first recess 156 may be less than the circumferential direction length l4 of the second recess 1452.

Since the first recess 156 and the second recess 1452 are formed in different shapes, a restoring moment of a front area of the piston 150 can be further improved compared to the existing one. Hence, since a collision between the piston 150 and the cylinder 140 is prevented by increasing a minimum gap between the piston 150 and the cylinder 140 during a compression stroke of the linear compressor 100, reliability of the linear compressor 100 can be improved. In addition, a stable support of the piston 150 with respect to the cylinder 140 can be achieved.

The axial direction length l5 of the first recess 156 may be equal to or less than ¼ of an axial direction length d1 between the first supply port 1431 and the second supply port 1432. When the axial direction length l5 of the first recess 156 is greater than the axial direction length l3 of the second recess 1452, the minimum gap between the piston 150 and the cylinder 140 may increase during the compression stroke of the linear compressor 100. In this case, when the axial direction length l5 of the first recess 156 exceeds ¼ of the axial direction length d1 between the first supply port 1431 and the second supply port 1432, the minimum gap between the piston 150 and the cylinder 140 may decrease again during the compression stroke of the linear compressor 100. Therefore, setting the axial direction length l5 of the first recess 156 to be equal to or less than ¼ of the axial direction length d1 between the first supply port 1431 and the second supply port 1432 can maximally increase the minimum gap between the piston 150 and the cylinder 140 during the compression stroke of the linear compressor 100.

Figure 24:
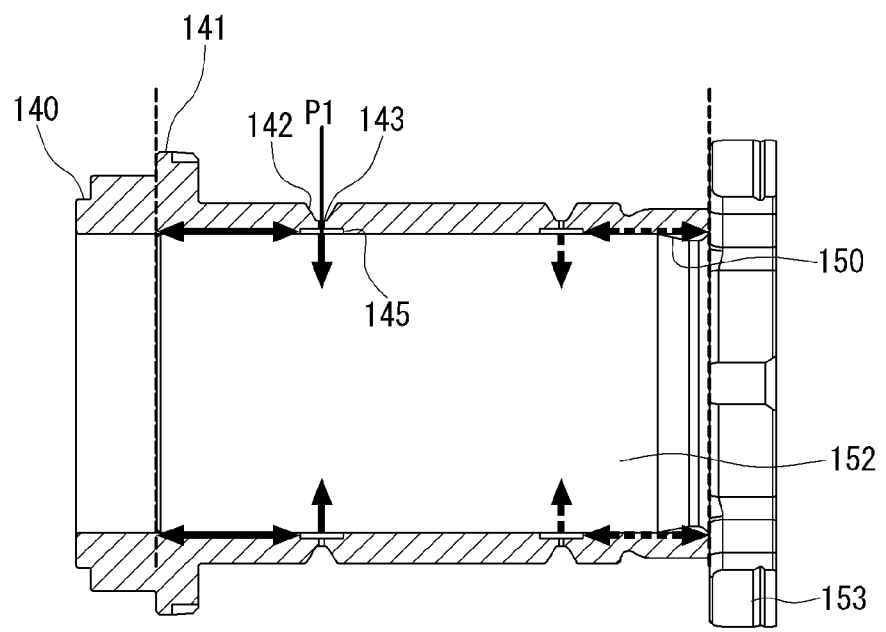
FIGS. 24 and 25 are cross-sectional views of a cylinder and a piston according to a related art.
Figure 25:
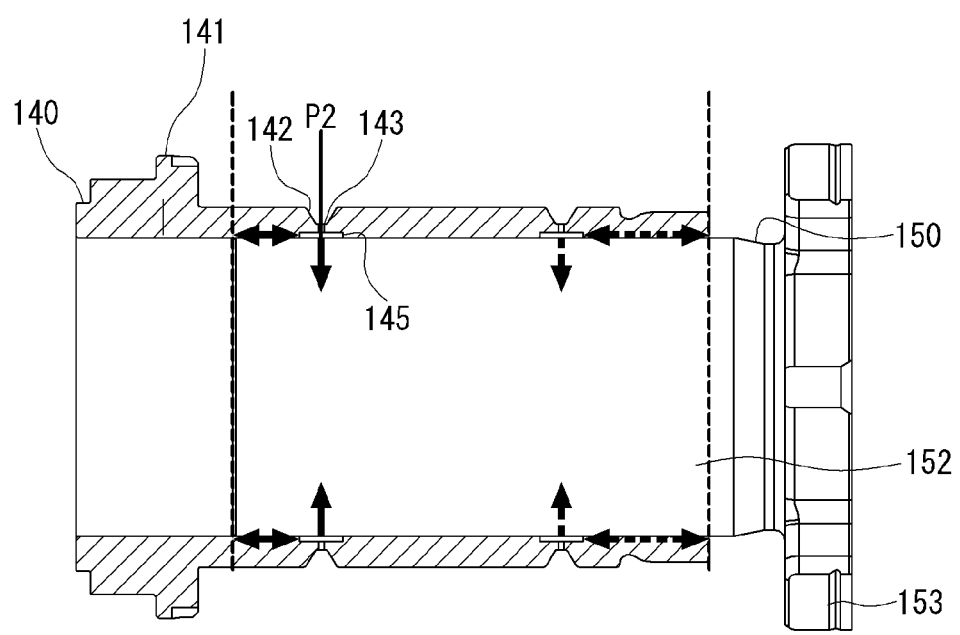

Referring to FIGS. 24 and 25, since a recess 145 of the related art linear compressor 100 is formed on an inner circumferential surface of the cylinder 140, support points P1 and P2 may continue to change when the piston 150 moves in an axial direction.

Referring to FIGS. 13 and 14, since the first recess 156 is disposed in the piston 150 of the linear compressor 100 according to another embodiment of the present disclosure, a refrigerant passing through the first supply port 1431 can be supplied to the same area of the first recess 156 when the piston 150 moves in the axial direction. Hence, since a collision between the piston 150 and the cylinder 140 is prevented by increasing the minimum gap between the piston 150 and the cylinder 140 during the compression stroke of the linear compressor 100, reliability of the linear compressor 100 can be improved. In addition, a stable support of the piston 150 with respect to the cylinder 140 can be achieved.

Figure 15:
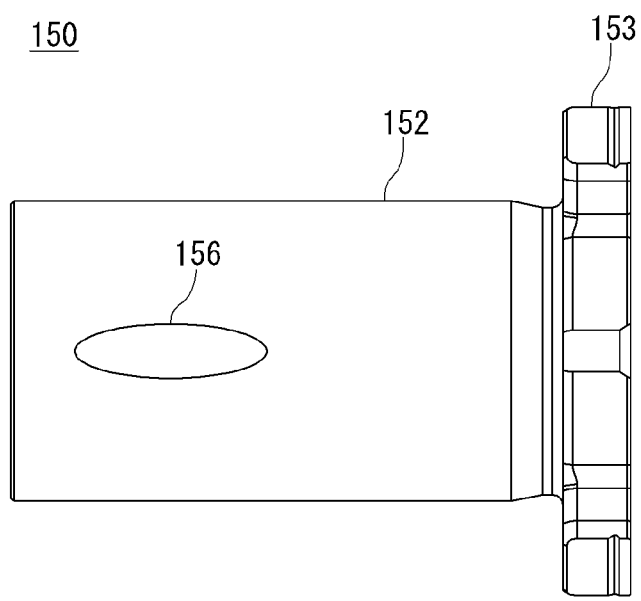
FIGS. 15 to 19 are modified implementations of a first recess according to another embodiment of the present disclosure.

Referring to FIG. 15, the first recess 156 of the piston 150 may have curvature. More specifically, a cross section of the first recess 156 may have curvature. In this case, the reliability can be improved prevented by suppressing the possibility of eddy current that may occur in the first recess 156. Further, the second recess 1452 may have curvature in the same manner as the second recess 1452 of the linear compressor 100 according to an embodiment of the present disclosure.

Figure 16:
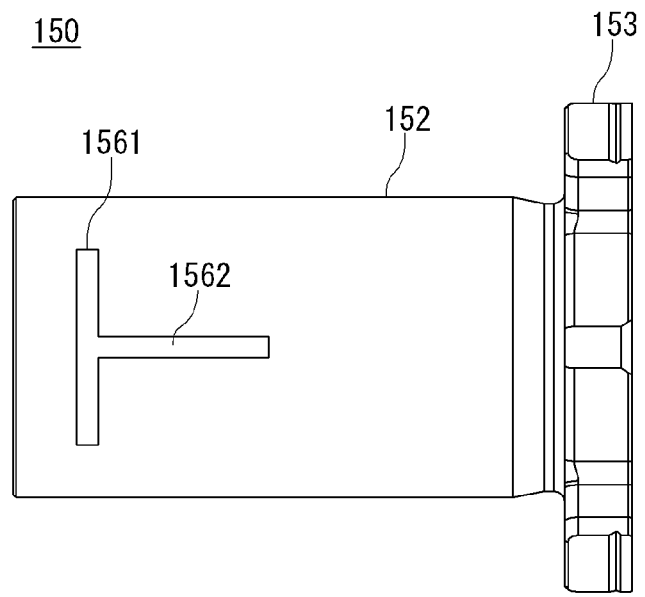
Figure 18:
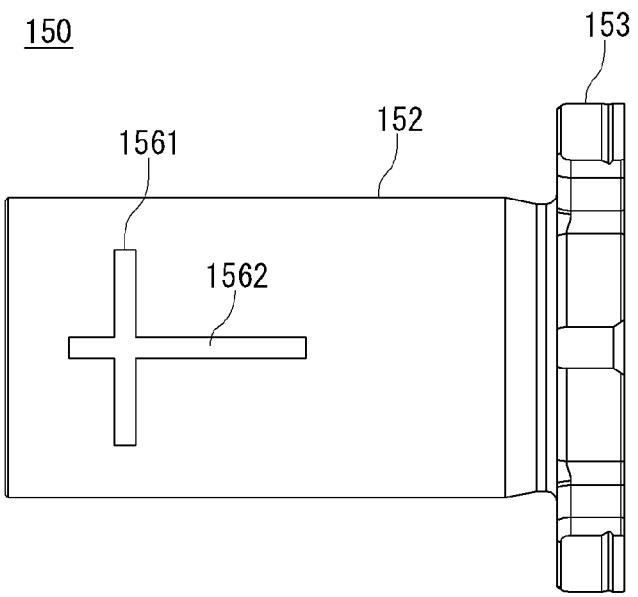

Referring to FIGS. 16 and 18, the first recess 156 may include a first portion 1561 extended in the circumferential direction, and a second portion 1562 that is connected to the first portion 1561 and extended in the axial direction.

In this instance, a central area of the second portion 1562 in the circumferential direction may be formed to be deeper than other area of the second portion 1562 in the circumferential direction. More specifically, a depth of the central area of the second portion 1562 in the circumferential direction measured from the outer circumferential surface of the piston 150 may be greater than a depth of the other area of the second portion 1562 in the circumferential direction measured from the outer circumferential surface of the piston 150. Hence, a reduction in compression efficiency caused by a refrigerant leakage can be prevented.

Further, a front area of the second portion 1562 may be formed to be deeper than an axial direction center area of the second portion 1562. More specifically, a depth of the front area of the second portion 1562 measured from the outer circumferential surface of the piston 150 may be greater than a depth of the axial direction center area of the second portion 1562 measured from the outer circumferential surface of the piston 150. Hence, a reduction in the compression efficiency caused by the refrigerant leakage can be prevented.

A central area of the first portion 1561 in the circumferential direction may be formed to be deeper than other area of the first portion 1561 in the circumferential direction. More specifically, a depth of the central area of the first portion 1561 in the circumferential direction measured from the outer circumferential surface of the piston 150 may be greater than a depth of the other area of the first portion 1561 in the circumferential direction measured from the outer circumferential surface of the piston 150. Hence, a reduction in the compression efficiency caused by the refrigerant leakage can be prevented.

Figure 17:
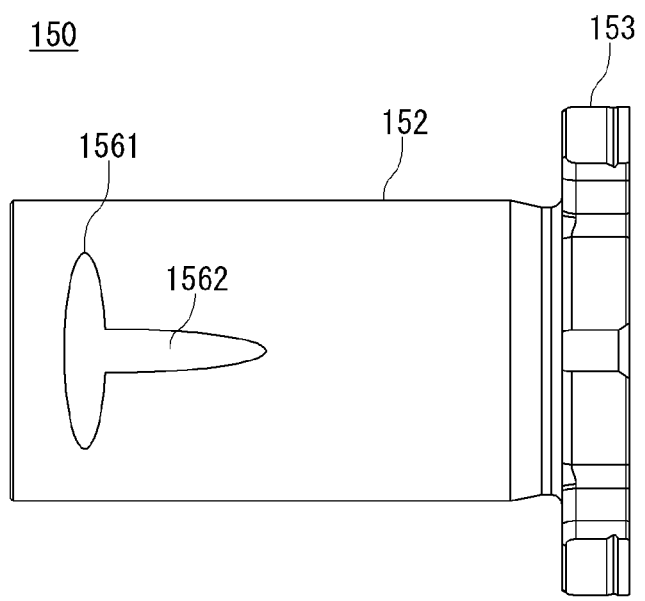
Figure 19:
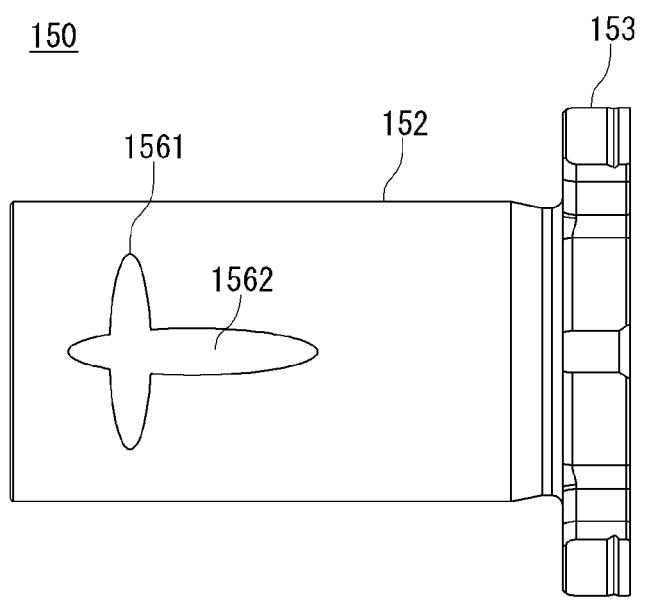
Figure 20:
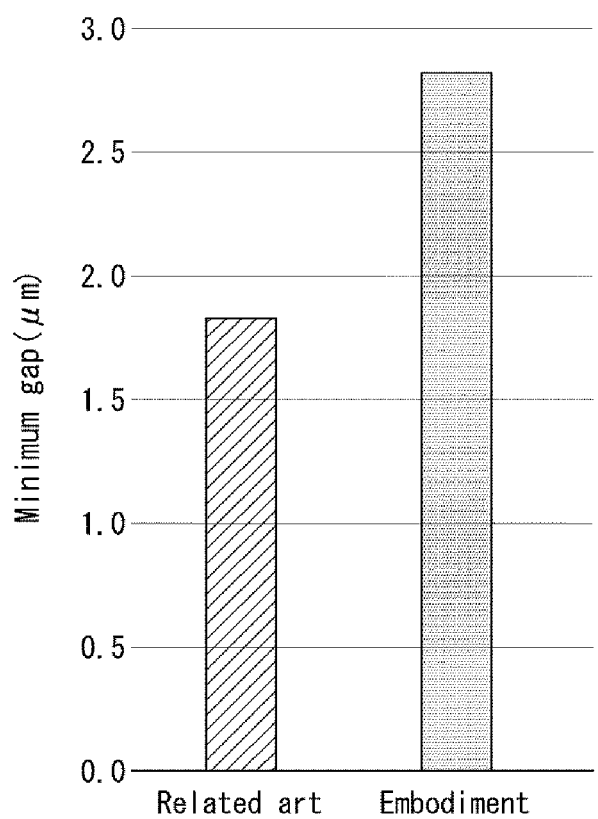
FIG. 20 is a graph illustrating a minimum gap between a cylinder and a piston according to a related art and another embodiment of the present disclosure.
Figure 21:
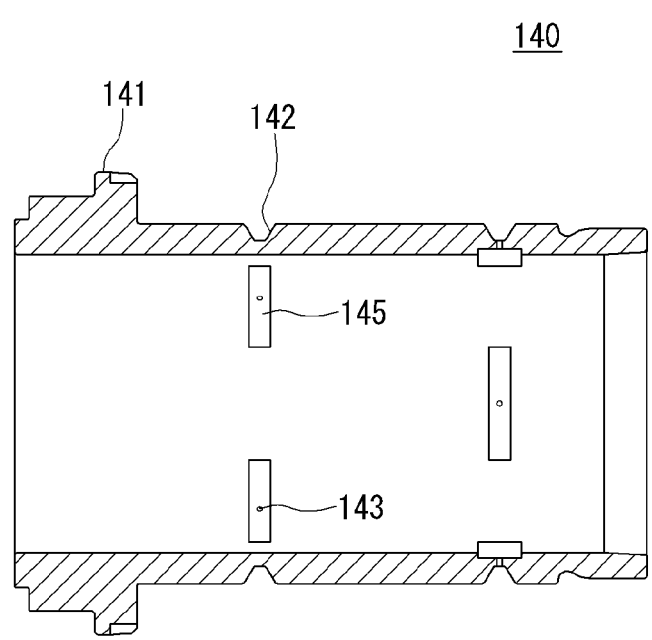
FIG. 21 is a cross-sectional view of a cylinder according to a related art.
Figure 22:
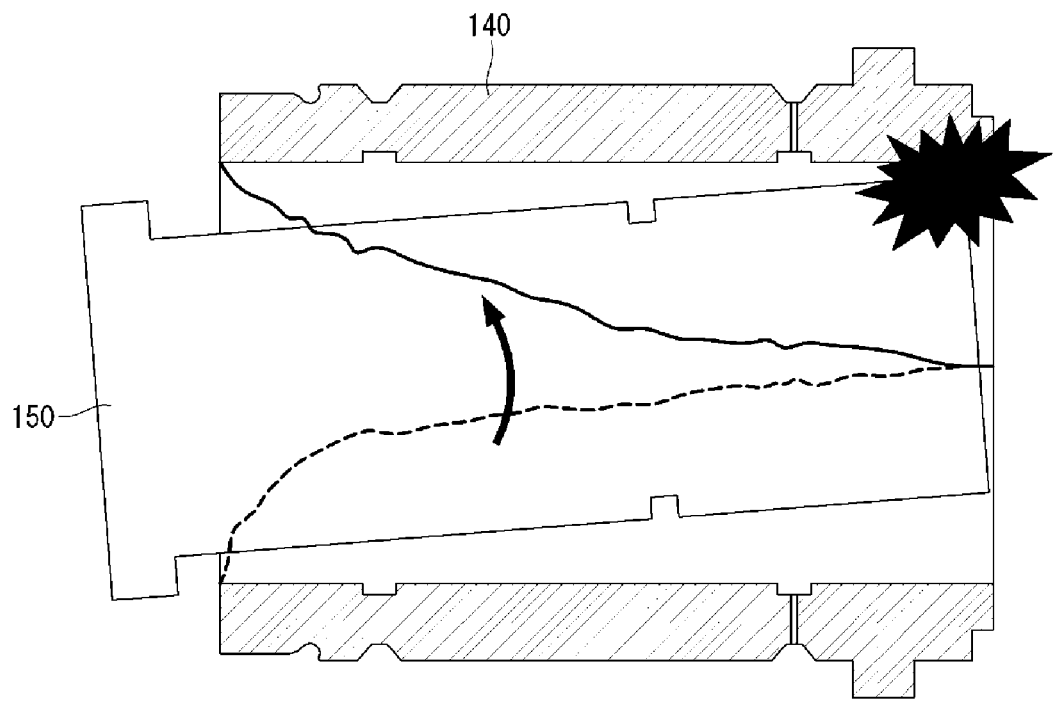
FIG. 22 illustrates a compression stroke of a piston according to a related art.
Figure 23:
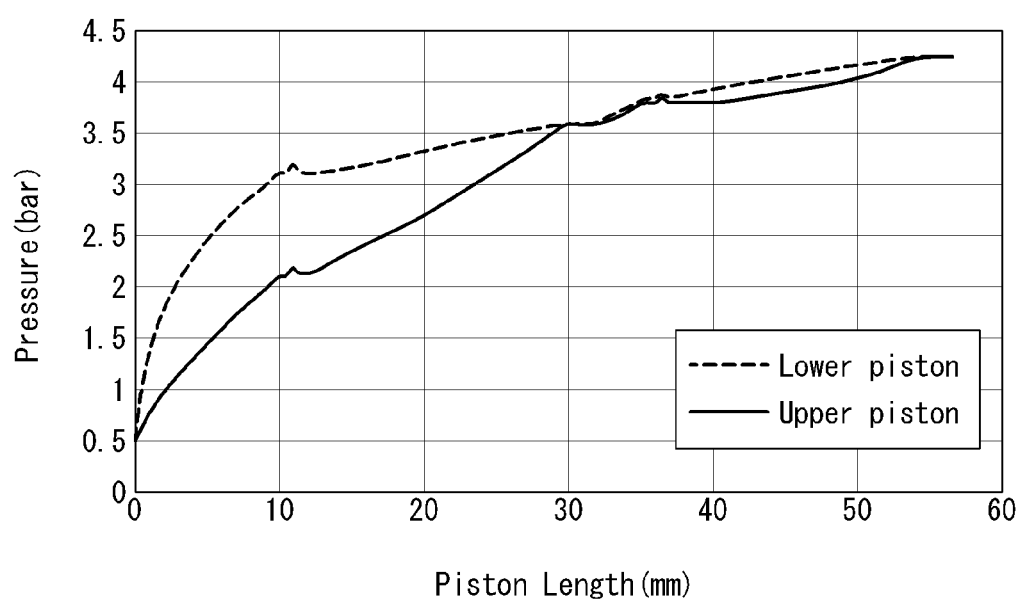
FIG. 23 is a graph illustrating a pressure distribution of a piston during a compression stroke of the piston according to a related art.

Referring to FIGS. 17 and 19, the first portion 1561 and the second portion 1562 of the first recess 156 may have curvature. More specifically, a cross section of the first portion 1561 and a cross section of the second portion 1562 may have curvature. In this case, the reliability can be improved by suppressing the possibility of eddy current that may occur in the first portion 1561 and the second portion 1562.

It can be seen from FIG. 20 that the minimum gap between the cylinder 140 and the piston 150 of the linear compressor 100 according to another embodiment of the present disclosure is greater than the minimum gap of the related art linear compressor 100. Hence, since a collision between the cylinder 140 and the piston 150 is prevented during the compression stroke of the linear compressor 100, reliability of the linear compressor 100 can be improved. In addition, a stable support of the piston 150 with respect to the cylinder 140 can be achieved.

These principles can be equally applied to other embodiments of the present disclosure.

Some embodiments or other embodiments of the present disclosure described above are not exclusive or distinct from each other. Some embodiments or other embodiments of the present disclosure described above can be used together or combined in configuration or function.

For example, configuration "A" described in an embodiment and/or the drawings and configuration "B" described in another embodiment and/or the drawings can be combined with each other. That is, even if the combination between the configurations is not directly described, the combination is possible except in cases where it is described that it is impossible to combine.

The above detailed description is merely an example and is not to be considered as limiting the present disclosure. The scope of the present disclosure should be determined by rational interpretation of the appended claims, and all variations within the equivalent scope of the present disclosure are included in the scope of the present disclosure.

What is claimed is:

1. A linear compressor comprising:
a cylinder that defines a compression space configured to receive refrigerant; and
a piston disposed in the cylinder and configured to reciprocate along an axial direction of the cylinder,
wherein the cylinder defines:
a plurality of supply ports that radially pass through the cylinder, the plurality of supply ports comprising a first supply port and a second supply port that are spaced apart from each other in the axial direction, and
a plurality of recesses that are defined at an inner circumferential surface of the cylinder, each of the plurality of recesses being in fluid communication with at least one of the plurality of supply ports,
wherein the plurality of recesses comprises a first recess and a second recess that are spaced apart from each other in the axial direction,
wherein the first recess comprises:
a first portion that extends in a circumferential direction of the cylinder; and
a second portion that is connected to the first portion and extends along the axial direction, and
wherein a front depth of a front area of the second portion is greater than a central depth of an axial direction center area of the second portion, the front area being disposed toward the compression space relative to the axial direction center area in the axial direction.

* * * * *